US012726955B2

(12) United States Patent
Yu et al.

(10) Patent No.: US 12,726,955 B2

(45) Date of Patent: Sep. 1, 2026

(54) WIRELESS RESOURCE SCHEDULING METHOD, ELECTRONIC DEVICE, AND STORAGE MEDIUM

(71) Applicant: Ruijie Networks Co., Ltd., Fuzhou (CN)

(72) Inventors: Chenglong Yu, Fuzhou (CN); Kaibin Mao, Fuzhou (CN); Zhaoxian Zhou, Fuzhou (CN); Zhongdong Liu, Fuzhou (CN)

(73) Assignee: Ruijie Networks Co., Ltd., Fuzhou (CN)

(*) Notice: Subject to any disclaimer, the term of this patent is extended or adjusted under 35 U.S.C. 154(b) by 314 days.

(21) Appl. No.: 18/524,394

(22) Filed: Nov. 30, 2023

(65) Prior Publication Data

US 2024/0114492 A1 Apr. 4, 2024

Related U.S. Application Data

(63) Continuation of application No. PCT/CN2022/142527, filed on Dec. 27, 2022.

(30) Foreign Application Priority Data

Dec. 27, 2021 (CN) ........................ 202111617276.0
Dec. 15, 2022 (CN) ........................ 202211615278.0

(51) Int. Cl.
*H04W 72/04* (2023.01)
*H04W 72/0446* (2023.01)
(Continued)

(52) U.S. Cl.
CPC ....... *H04W 72/0446* (2013.01); *H04W 72/12* (2013.01); *H04W 72/30* (2023.01); *H04W 72/566* (2023.01)

(58) Field of Classification Search
CPC . H04W 72/0446; H04W 72/12; H04W 72/23; H04W 72/30; H04W 72/56;
(Continued)

(56) References Cited

U.S. PATENT DOCUMENTS

2003/0032411 A1* 2/2003 Kim .................... H04W 72/569 455/414.1
2004/0185918 A1* 9/2004 Fan .................. H04W 52/0248 455/574
(Continued)

FOREIGN PATENT DOCUMENTS

CN 101159648 A 4/2008
CN 102301668 A 12/2011
(Continued)

OTHER PUBLICATIONS

Extended European Search Report and Search Opinion received for European Application No. 22914831.7, mailed on Mar. 5, 2025, 9 pages.

*Primary Examiner* — Phuc H Tran

(74) *Attorney, Agent, or Firm* — ArentFox Schiff LLP; Michael Fainberg

(57) ABSTRACT

Embodiments of this application provide a wireless resource scheduling method, an electronic device and a computer-readable storage medium. The method includes the following steps: An access device obtains a first station state set, where the first station state set includes station states of a plurality of stations in a first time window; the access device obtains, in a preset time window, first timeslot allocation information based on the station states, where the first timeslot allocation information includes timeslot allocation information of the access device for each station for using a wireless resource in at least one time window; and the access device broadcasts the first timeslot allocation information to the stations, respectively.

19 Claims, 10 Drawing Sheets

(51) Int. Cl.

| | |
|---|---|
| ***H04W 72/12*** | (2023.01) |
| ***H04W 72/30*** | (2023.01) |
| ***H04W 72/566*** | (2023.01) |

(58) Field of Classification Search

CPC . H04W 72/566; H04W 72/569; H04W 74/04; H04W 84/12

See application file for complete search history.

(56) References Cited

U.S. PATENT DOCUMENTS

| | | | | |
|---|---|---|---|---|
| 2015/0327262 | A1* | 11/2015 | Kwon | H04W 72/0446 370/329 |
| 2015/0341130 | A1 | 11/2015 | Zhou et al. | |
| 2015/0351125 | A1 | 12/2015 | Kwon et al. | |
| 2016/0029357 | A1* | 1/2016 | Lv | H04L 47/125 370/235 |
| 2017/0079033 | A1 | 3/2017 | Lin et al. | |
| 2020/0092850 | A1* | 3/2020 | Jiang | H04W 72/04 |

FOREIGN PATENT DOCUMENTS

| | | | | |
|---|---|---|---|---|
| CN | 104581979 A | 4/2015 | | |
| CN | 105191474 A | 12/2015 | | |
| CN | 105594151 A | 5/2016 | | |
| CN | 105900512 A | 8/2016 | | |
| CN | 106792723 A | 5/2017 | | |
| CN | 107852766 A | 3/2018 | | |
| CN | 112118636 A | 12/2020 | | |
| CN | 113316230 A | 8/2021 | | |
| EP | 2966921 A1 * | 1/2016 | | H04W 72/20 |
| WO | WO-2004034680 A1 * | 4/2000 | | H04W 52/34 |
| WO | 2018/107370 A1 | 6/2018 | | |

* cited by examiner

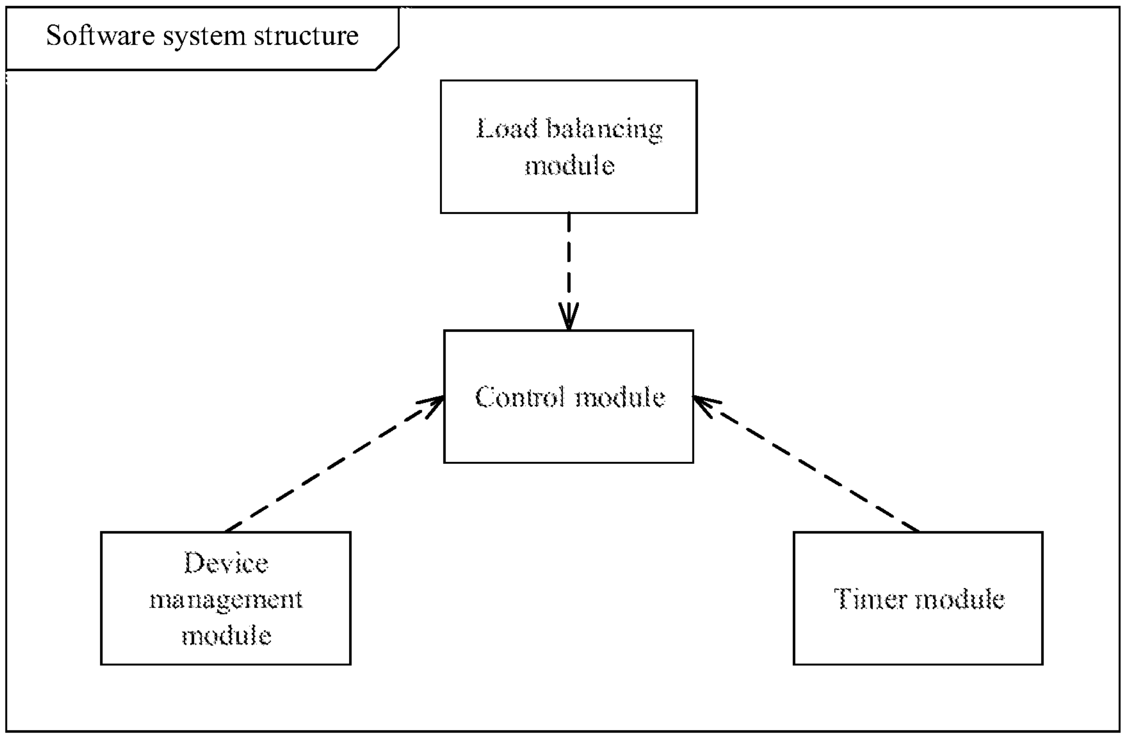

FIG. 1

101. After a STA is successfully associated with an AP, the STA initiates a TDMA access request to the AP, and an AP device management module allocates a unique identifier ID to the STA, performs scheduling, and responds to the access request of the STA 102. After TDMA access of the STA, the AP periodically publishes timeslot arrangement information, and the STA periodically polls the timeslot arrangement information

FIG. 2

| STA 3 | STA 1 | STA 1 | STA 4 | STA 2 | STA 2 |
|---|---|---|---|---|---|

| Sending station STA 3 | Sending station STA 1 | Sending station STA 1 | Sending station STA 4 | Sending station STA 2 | Sending station STA 2 |
|---|---|---|---|---|---|
| Receiving station STA 1 | Receiving station AP | Receiving station AP | Receiving station STA 2 | Receiving station AP | Receiving station AP |
| 1 | 2 | 3 | 4 | 5 | 6 |

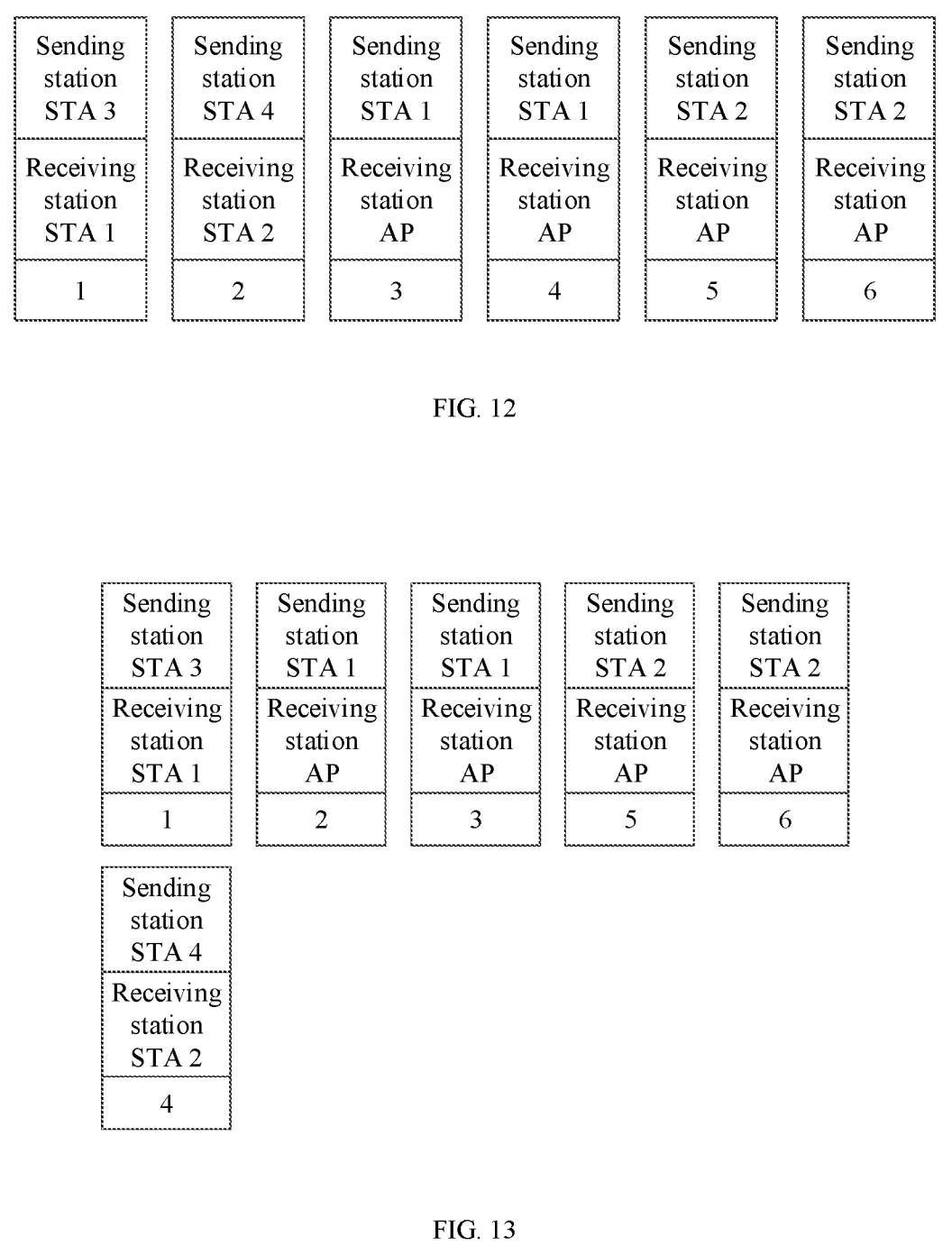

| Sending station STA 3 | Sending station STA 4 | Sending station STA 1 | Sending station STA 1 | Sending station STA 2 | Sending station STA 2 |
|---|---|---|---|---|---|
| Receiving station STA 1 | Receiving station STA 2 | Receiving station AP | Receiving station AP | Receiving station AP | Receiving station AP |
| 1 | 2 | 3 | 4 | 5 | 6 |

FIG. 12

| Sending station STA 3 | Sending station STA 1 | Sending station STA 1 | Sending station STA 2 | Sending station STA 2 |
|---|---|---|---|---|
| Receiving station STA 1 | Receiving station AP | Receiving station AP | Receiving station AP | Receiving station AP |
| 1 | 2 | 3 | 5 | 6 |
| Sending station STA 4 | | | | |
| Receiving station STA 2 | | | | |
| 4 | | | | |

FIG. 13

WIRELESS RESOURCE SCHEDULING METHOD, ELECTRONIC DEVICE, AND STORAGE MEDIUM

CROSS-REFERENCE TO RELATED APPLICATIONS

The present application is a continuation of International Patent Application No. PCT/CN2022/142527, which claims priority to a Chinese patent application No. 202111617276.0, filed on Dec. 27, 2021, and a Chinese patent application No. 202211615278.0, filed on Dec. 15, 2022, all of which are incorporated herein by reference in their entireties.

TECHNICAL FIELD

The present application relates to the field of data communications technologies, and in particular, to a wireless resource scheduling method, an electronic device, and a storage medium.

BACKGROUND

In a case of long-distance data transmission, there is a long distance between terminals, the terminals cannot detect signals from each other, and an uplink data stream from a terminal to an AP is subject to a severe collision. Consequently, performance is affected. This is known as a problem of "hidden nodes".

To prevent a collision, 802.11 allows a workstation to use a request to send (English: Request To Send, RTS for short) frame and a clear to send (English: Clear To Send, CTS for short) frame to clear a transmission queue. The RTS itself has two purposes: to reserve the authorization to use a wireless medium, and to ask another workstation receiving this message to stop speaking. Once a receiver receives an RTS, the receiver responds with a CTS. Like the RTS, the CTS also makes nearby workstations silent. However, there is a collision in sending an RTS packet by a STA itself. Therefore, only a collision frequency can be reduced, but the collision problem is not resolved thoroughly.

In the 802.11 standard, Point Coordination Function (PCF for short) is another mode for accessing a wireless medium. The PCF allows an 802.11 network to provide a fair medium access mechanism, and an AP polls whether a terminal supporting the protocol has data to send. Therefore, each terminal can independently occupy channel resources, and no collision occurs in data transmission, thereby resolving the collision problem of hidden nodes in long-distance transmission. However, there are still disadvantages: A transmission time of a terminal polled to send data cannot be accurately controlled, and uncertainty of the sending time affects transmission of service data, and further makes it impossible for the AP to accurately ensure QoS for the terminal. In addition, the AP is unable to know which terminals need to send data and which terminals do not need to send data. Therefore, a part of the polling time is unnecessarily allocated to the terminals that do not need to send data, causing a waste of wireless medium resources.

SUMMARY

Embodiments of the present application provide a wireless resource scheduling method, an electrical device, and a storage medium.

According to a first aspect, an embodiment of this application provides a wireless resource scheduling method from a perspective of an access device. The method includes the following steps.

An access device obtains a first station state set, where the first station state set includes station states of a plurality of stations in a first time window;

- the access device obtains, in a preset time window, first timeslot allocation information based on the station states, where the first timeslot allocation information includes timeslot allocation information of the access device for each station for using a wireless resource in at least one time window; and
- the access device broadcasts the first timeslot allocation information to the stations, respectively.

In some embodiments, that the access device obtains first timeslot allocation information based on the station states includes:

- obtaining a preset mapping relationship, where the preset mapping relationship includes a mapping relationship between a plurality of timeslot parameters, timeslot parameter values corresponding to the plurality of timeslot parameters, and description information of the timeslot parameters; and
- generating the first timeslot allocation information based on the preset mapping relationship and the station states.

In some embodiments, a station state of a third station of the stations includes real-time traffic and a current priority for accessing a wireless medium service, and the method further includes:

- the access device receives a second station state set from the third station to add to a second station state set, where the second station state set includes station states of the plurality of stations in a second time window, and a start time point of the second time window lags behind an end time point of the first time window; and
- the access device updates a timeslot weight of the third station in the first timeslot allocation information based on the second station state set, where a value of the timeslot weight is in a positive relationship with the priority and/or the real-time traffic of the third station.

In some embodiments, the plurality of stations include a first station and a second station, and a priority of the first station is higher than a priority of the second station;

- the first timeslot allocation information further includes timeslot allocation information for using wireless resources in at least two time windows, the at least two time windows include at least a third time window and a fourth time window, and the fourth time window lags behind the third time window;
- a quantity of timeslots occupied by the first station in each time window of the at least two time windows, or of the second time window and the at least two time windows, is larger than a quantity of timeslots occupied by the second station in each time window; and
- a time domain position of the first station in the third time window corresponds to a time domain position of the first station in the fourth time window, and a time domain position of the second station in the third time window corresponds to a time domain position of the second station in the fourth time window.

In some embodiments, that the access device obtains first timeslot allocation information based on the station states includes:

the access device obtains first timeslot allocation information based on the station states in the second time window, the first timeslot allocation information based on the station states.

In some embodiments, that the access device broadcasts the first timeslot allocation information to the stations, respectively, includes:

the access device broadcasts the first timeslot allocation information to the stations, respectively before the second time window ends.

In some embodiments, that the access device obtains first timeslot allocation information based on the station states includes:

determining, based on the timeslot allocation information for each station for using the wireless resource in the at least one time window, a plurality of pieces of schedule arrangement information corresponding to each timeslot, where a piece of schedule arrangement information includes a receiving station and a sending station corresponding to a corresponding timeslot;

sorting the plurality of pieces of obtained schedule arrangement information based on timeslots in the timeslot allocation information, to obtain a first arrangement table;

determining whether at least one group of pieces of target schedule arrangement information meeting a specified condition exists in the plurality of pieces of schedule arrangement information, where the group of pieces of target schedule arrangement information includes at least two pieces of schedule arrangement information;

merging, when the at least one group of pieces of target schedule arrangement information exists, timeslots for the at least two pieces of schedule arrangement information in the at least one group of target schedule arrangement information; and re-allocating timeslots based on a result of merging the at least one group of target schedule arrangement information, to obtain a first timeslot allocation information.

In some embodiments, the meeting the specified condition includes: strength of signals received between every two sending stations that concurrently send data is not higher than a specified threshold, and the receiving stations in the plurality of pieces of schedule arrangement information corresponding to the sending stations are different from each other.

In some embodiments, the determining whether the at least one group of target schedule arrangement information meeting the specified condition exists in the plurality of pieces of schedule arrangement information, includes:

sorting the plurality of pieces of schedule arrangement information in the first arrangement table based on station addresses of receiving stations corresponding to the timeslots in the timeslot allocation information, to obtain a second arrangement table;

determining a first piece of schedule arrangement information on which no merger decision is performed in the current second arrangement table, performing a merger decision on the first piece of schedule arrangement information, and determining whether a to-be-merged piece of schedule arrangement information meeting the specified condition exists in other piece of schedule arrangement information after the first piece of schedule arrangement information;

when determining that the to-be-merged piece of schedule arrangement information exists, removing, from the second arrangement table, the first piece of schedule arrangement information and the to-be-merged piece of schedule arrangement information as a group of target schedule arrangement information; and repeating the foregoing steps until only one first piece of schedule arrangement information or no first piece of schedule arrangement information on which no merger decision is performed exists in the current second arrangement table.

In some embodiments, the performing the merger decision on the first piece of schedule arrangement information, and determining whether the to-be-merged piece of schedule arrangement information meeting the specified condition exists in the other piece of schedule arrangement information after the first piece of schedule arrangement information, includes:

sequentially comparing the first piece of schedule arrangement information with the other piece of schedule arrangement information after the first piece of schedule arrangement information, and when a first target other piece of target other schedule arrangement information meeting the specified condition is determined from the other schedule arrangement information, determining that the to-be-merged piece of schedule arrangement information meeting the specified condition exists in the other piece of schedule arrangement information; where the meeting the specified condition is: a receiving station in one of the other piece of schedule arrangement information is different from a receiving station in the first piece of schedule arrangement information, and a sending station in one of the other piece of schedule arrangement information is not a neighboring station of the receiving station in the first piece of schedule arrangement information.

In some embodiments, the meeting the specified condition includes:

a receiving station in one of the other piece of schedule arrangement information is different from a receiving station in the first piece of schedule arrangement information, and a sending station in the other piece of schedule arrangement information is a neighboring station of the receiving station in the first piece of schedule arrangement information, and signal strength of the neighboring station is not higher than a specified threshold.

In some embodiments, the performing the merger decision on the first piece of schedule arrangement information, and determining whether the to-be-merged piece of schedule arrangement information meeting the specified condition exists in the other piece of schedule arrangement information after the first piece of schedule arrangement information, includes:

separately comparing the first piece of schedule arrangement information with the other pieces of schedule arrangement information after the first piece of schedule arrangement information, and when at least one piece target other of target other schedule arrangement information meeting the specified condition is determined from the other pieces of schedule arrangement information, determining that the to-be-merged pieces of schedule arrangement information meeting the specified condition exists in the other pieces of schedule arrangement information.

In some embodiments, the re-allocating the timeslots based on the result of merging each group of target schedule arrangement information, to obtain the first timeslot allocation information, includes:

re-allocating timeslots for the plurality of pieces of schedule arrangement information based on a time sequence of timeslots corresponding to each merged group of target schedule arrangement information and timeslots corresponding to unmerged pieces of schedule arrangement information, to update the first timeslot allocation information.

In some embodiments, the broadcasting, by the access device, the first timeslot allocation information to the stations, respectively, the method further executing, by the access device, the timeslot arrangement information in a specified timeslot.

In some embodiments, after the broadcasting, by the access device, the first timeslot allocation information to the stations, respectively, the method further includes:

re-generating and broadcasting, by the access device, timeslot arrangement information when receiving timeout information from a station.

In some embodiments, the method further includes:

scheduling, by the access device, synchronization based on a timing synchronization function (TSF) of the access device as a time reference.

In some embodiments, the step of obtaining, by the access device in a preset time window, comprises:

determining, by the access device, non-colliding sending stations in a networking topology based on nearby station information sent by each station; and reducing, by the access device, timeslot allocation information of the non-colliding sending stations for generating the first timeslot allocation information.

According to a second aspect, an embodiment of this application provides a wireless resource scheduling method from a perspective of a first station. The method includes the following steps.

A first station receives first timeslot allocation information from an access device, where the first timeslot allocation information includes timeslot allocation information of the access device for each station for using a wireless resource in at least one time window;

the first station polls the first timeslot allocation information;

when determining that a station identifier corresponding to a current first timeslot is a station identifier of the first station, the first station updates a current first priority for accessing a wireless medium service by the first station to a second priority, where the second priority is higher than the first priority; and the first station sends first data in the first timeslot by using the wireless resource.

In some embodiments, that the first station updates a current first priority for accessing a wireless medium service by the first station to a second priority includes the first station obtains an EDCA parameter, and updates the EDCA parameter, to update the current first priority for accessing the wireless medium service by the first station to the second priority.

In some embodiments, after the first station polls the first timeslot allocation information, the method further includes:

when determining that a station identifier corresponding to a current second timeslot is not the station identifier of the first station, the first station updates the current second priority for accessing the wireless medium service by the first station to the first priority; and the first station sends second data in the second timeslot without using the wireless resource or by using the wireless resource, where a ratio of a size of the second data to a size of the first data is less than a preset value.

According to a third aspect, an embodiment of this application further provides an access device. The access device includes:

a transceiver module, configured to obtain a first station state set, where the first station state set includes station states of a plurality of stations in a first time window; and a processing module, configured to obtain, in a preset time window, first timeslot allocation information based on the station states, where the first timeslot allocation information includes timeslot allocation information of the access device for each station for using a wireless resource in at least one time window, where the transceiver module is further configured to broadcast the first timeslot allocation information obtained by the processing module to each station.

In some embodiments, the processing module is specifically configured to:

obtain a preset mapping relationship, where the preset mapping relationship includes a mapping relationship between a plurality of timeslot parameters, timeslot parameter values corresponding to the plurality of timeslot parameters, and description information of the timeslot parameters; and generate the first timeslot allocation information based on the preset mapping relationship and the station states.

In some embodiments, a station state of each station includes real-time traffic and a current priority for accessing a wireless medium service, and the processing module is further configured to:

receive a second station state set from the stations by using the transceiver module, where the second station state set includes station states of the plurality of stations in a second time window, and a start time of the second time window lags behind an end time of the first time window; and update a timeslot weight of each station in the first timeslot allocation information based on the second station state set, where a value of the timeslot weight is in a positive relationship with a priority and/or transmission traffic of the station.

In some embodiments, the plurality of stations include a first station and a second station, and a priority of the first station is higher than a priority of the second station;

the first timeslot allocation information includes timeslot allocation information for using wireless resources in at least three time windows, the at least three time windows include at least a third time window and a fourth time window, and the fourth time window lags behind the third time window;

a quantity of timeslots occupied by the first station in each time window is larger than a quantity of timeslots occupied by the second station in each time window; and a time domain position of the first station in the third time window corresponds to a time domain position of the first station in the fourth time window, and a time domain position of the second station in the third time window corresponds to a time domain position of the second station in the fourth time window.

In some embodiments, the processing module is further configured to:

determine, based on the timeslot allocation information for each station for using the wireless resource in the at least one time window, schedule arrangement information corresponding to each timeslot, where the schedule arrangement information includes a receiving station and a sending station corresponding to the corresponding timeslot;

sort a plurality of pieces of obtained schedule arrangement information by timeslots in the timeslot allocation information, to obtain a first arrangement table;

determine whether at least one group of target schedule arrangement information meeting a specified condition exists in the plurality of pieces of schedule arrangement information, where a group of target schedule arrangement information includes at least two pieces of schedule arrangement information;

when the at least one group of target schedule arrangement information exists, merge timeslots in at least two pieces of schedule arrangement information in each group of target schedule arrangement information; and re-allocate timeslots based on a result of merging each group of target schedule arrangement information, to obtain the first timeslot allocation information.

In some embodiments, the processing module is further configured to:

sort the plurality of pieces of schedule arrangement information in the first arrangement table by station addresses of receiving stations corresponding to the timeslots, to obtain a second arrangement table;

determine first piece of schedule arrangement information on which no merger decision is performed in the current second arrangement table, perform a merger decision on the first piece of schedule arrangement information, and determine whether to-be-merged schedule arrangement information meeting the specified condition exists in other schedule arrangement information after the first piece of schedule arrangement information;

when determining that the to-be-merged schedule arrangement information exists, remove, from the second arrangement table, the first piece of schedule arrangement information and the to-be-merged schedule arrangement information as a group of target schedule arrangement information; and repeat the foregoing steps until only one first piece of schedule arrangement information or no first piece of schedule arrangement information on which no merger decision is performed exists in the current second arrangement table.

In some embodiments, the processing module is further configured to:

sequentially compare the first piece of schedule arrangement information with the other schedule arrangement information after the first piece of schedule arrangement information, and when a first piece of target other schedule arrangement information meeting the specified condition is determined from the other schedule arrangement information, determine that the to-be-merged schedule arrangement information meeting the specified condition exists in the other schedule arrangement information; or separately compare the first piece of schedule arrangement information with the other schedule arrangement information after the first piece of schedule arrangement information, and when at least one piece of target other schedule arrangement information meeting the specified condition is determined from the other schedule arrangement information, determine that the to-be-merged schedule arrangement information meeting the specified condition exists in the other schedule arrangement information;

where the meeting the specified condition is: a receiving station in the other schedule arrangement information is different from a receiving station in the first piece of schedule arrangement information, and a sending station in the other schedule arrangement information is not a neighboring station of the receiving station in the first piece of schedule arrangement information; or a receiving station in the other schedule arrangement information is different from a receiving station in the first piece of schedule arrangement information, and a sending station in the other schedule arrangement information is a neighboring station of the receiving station in the first piece of schedule arrangement information, and signal strength of the neighboring station is not higher than a specified threshold.

In some embodiments, the processing module is further configured to:

re-allocate timeslots for the plurality of pieces of schedule arrangement information based on a time sequence of timeslots corresponding to each merged group of target schedule arrangement information and timeslots corresponding to unmerged schedule arrangement information, to obtain the first timeslot allocation information.

According to a fourth aspect, an embodiment of this application further provides a first station. The first station includes:

a transceiver module, configured to receive first timeslot allocation information from an access device, where the first timeslot allocation information includes timeslot allocation information of the access device for each station for using a wireless resource in at least one time window; and a processing module, configured to: poll the first timeslot allocation information; and when determining that a station identifier corresponding to a current first timeslot is a station identifier of the first station, update a current first priority for accessing a wireless medium service by the first station to a second priority, where the second priority is higher than the first priority, where the transceiver module is further configured to send first data in the first timeslot by using the wireless resource.

In some embodiments, the processing module is specifically configured to:

obtain, by using the transceiver module, an EDCA parameter, and update the EDCA parameter, to update the current first priority for accessing the wireless medium service by the first station to the second priority.

In some embodiments, after polling the first timeslot allocation information, the processing module is further configured to:

when determining that a station identifier corresponding to a current second timeslot is not the station identifier of the first station, update the current second priority for accessing the wireless medium service by the first station to the first priority; and send, by using the transceiver module, second data in the second timeslot without using the wireless resource or by using the wireless resource, where a ratio of a size of the second data to a size of the first data is less than a preset value.

According to a fifth aspect, an embodiment of this application further provides an electronic device, including a processor and a memory, where the memory stores a computer program, and when the processor invokes the computer program in the memory, the steps in any wireless resource scheduling method provided by the first aspect or the second aspect in the embodiments of this application are performed.

According to a sixth aspect, an embodiment of this application further provides a non-transitory computer-readable storage medium. The computer-readable storage medium stores a plurality of instructions, and the instructions are suitable for being loaded by a processor to perform the steps in any wireless resource scheduling method provided by the first aspect or the second aspect in the embodiments of this application.

According to a seventh aspect, an embodiment of this application further provides a time division multiplexing system, including the access device according to the third aspect and the first station according to the fourth aspect.

As can be learned from the foregoing content, the embodiments of this application have the following technical effects.

After the access device obtains the first station state set of the station states in the first time window from the plurality of stations, the access device obtains, in the preset time window, the first timeslot allocation information based on the station states, and the access device broadcasts the first timeslot allocation information to the stations, respectively. Because the first timeslot allocation information includes the timeslot allocation information of the access device for each station for using the wireless resource in the at least one time window, after each station (for example, the first station) obtains the first timeslot allocation information through polling, the station can use the wireless resource to send data in a timeslot allocated to the station. In the timeslot in which the first station sends data, other stations can use the wireless resource to send only a small amount of data or cannot use the wireless resource to send data. Therefore, in this wireless resource scheduling manner, the time for each station to use the wireless resource can be properly scheduled, and communication interference from other stations can be avoided when the first station sends data in the timeslot of the first station.

Other features and advantages of this application will be set forth later in the specification, and in part will be readily apparent from the specification, or may be understood by implementing this application. Objectives and other advantages of this application may be achieved and obtained by using a structure particularly pointed out in the written specification, claims, and accompanying drawings.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application.

FIG. 1 is a schematic diagram of a structure of a software system of a time division multiplexing system in this application.

FIG. 2 is a schematic diagram of an operation procedure of a wireless resource scheduling method in this application.

FIG. 12 is a schematic diagram of a second arrangement table in this application.

FIG. 13 is a schematic diagram of a target arrangement table in this application.

DESCRIPTION OF EMBODIMENTS

Figure 3:
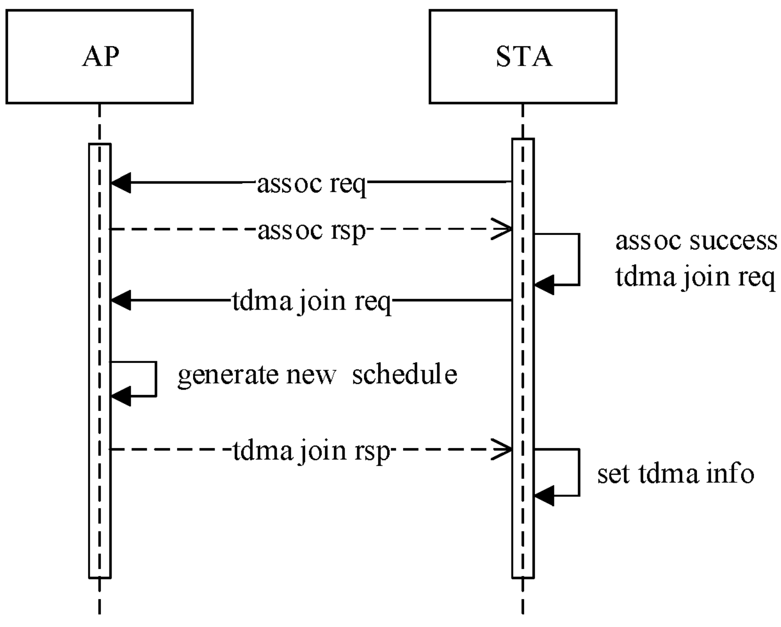
FIG. 3 is a schematic diagram of a signaling procedure of a wireless resource scheduling method in this application.

To make the objectives, technical solutions, and advantages of the embodiments of this application clearer, the following clearly and thoroughly describes the technical solutions of this application with reference to the accompanying drawings in the embodiments of this application. Apparently, the described embodiments are some but not all of the embodiments of this application. All other embodiments obtained by a person of ordinary skill in the art based on the embodiments described in this application document without creative efforts shall fall within the protection scope of the technical solutions of this application.

In the specification, claims, and accompanying drawings of this application, the terms “first” and “second” are used to distinguish between different objects, and not intended to describe a specific order. In addition, the terms “include” and any other variant thereof are intended to cover non-exclusive protection. For example, a process, method, system, product, or device that includes a list of steps or units is not limited to the listed steps or units, but optionally includes steps or units not listed, or optionally includes other steps or units inherent to the process, method, product, or device. The term “a plurality of” in this application may mean at least two, for example, two, three, or more. However, the embodiments of this application are not limited thereto.

In addition, the term “and/or” in this specification describes only an association relationship for describing associated objects and represents that three relationships may exist. For example, A and/or B may represent the following three cases: Only A exists, both A and B exist, and only B exists. In addition, unless otherwise specified, the character “/” in this specification usually indicates an “or” relationship between associated objects.

Before a wireless resource scheduling method is described, the following first describes a process of establishing a communication connection between a station and an access device (for example, an access point), to facilitate subsequent communication between each station and the access device, for example, to facilitate the access device in broadcasting timeslot allocation information to each station, and to facilitate each station in aperiodically or periodically polling the timeslot allocation information broadcast by the access device.

For an operation procedure of the wireless resource scheduling method in this application, refer to FIG. 2. The procedure includes: 101. After a STA is successfully associated with an AP (access point), the STA initiates a TDMA access request to the AP, and an AP device management module allocates a unique identifier ID to the STA, performs scheduling, and responds to the access request of the STA.

After access of the STA succeeds, the STA can participate in TDMA scheduling by using the ID.

102. After TDMA access of the STA, the AP periodically publishes timeslot arrangement information, and the STA periodically polls the timeslot arrangement information.

A normal priority for accessing a wireless medium service by the STA is a lowest priority. When only a current timeslot belongs to the STA, the priority for accessing the wireless medium service is increased by changing an enhanced distributed channel access (English: Enhanced Distributed Channel Access, EDCA for short) parameter.

Specifically, for a signaling flowchart for TDMA access by the STA, refer to FIG. 3. In FIG. 3, the STA first sends an access request (assoc req) to the AP to request access to the AP, and the AP returns access success information to the STA in response to the access request of the STA. After successfully accessing the AP, the STA generates a TDMA access request (assoc success tdma join req), and then can initiate the TDMA access request (tdma join req) to the AP. In response to the TDMA access request of the STA, the AP needs to incorporate the STA into a timeslot arrangement. Therefore, the AP needs to generate a piece of new timeslot arrangement information (generate new schedule) and return TDMA access success information to the STA. In addition, the information may include a unique identifier ID allocated by the AP to the STA. After successful TDMA access, the STA can participate in TDMA scheduling (set tdma info) based on the allocated ID.

In some embodiments, after the AP generates the timeslot arrangement information, a manner of updating a reserved timeslot may be used. The manner requires all devices (STAs and the AP) to be subject to the timeslot arrangement information in the same timeslot in the future, so that the devices use a mechanism of broadcast+response+timeout to ensure that the devices achieve synchronization of the timeslot arrangement information.

In the manner of updating the reserved timeslot, after the current timeslot is later than the reserved timeslot, the timeslot arrangement information is not successfully synchronized. In this case, the timeslot arrangement information is invalid due to synchronization failure and timeout, and it is necessary to reconstruct timeslot arrangement information or request the AP to reconstruct timeslot arrangement information.

For example, devices accessing the AP include a STA 1 and a STA 2. Assuming that the AP generates timeslot arrangement information at 12:00 and broadcasts the timeslot arrangement information to the STA 1 and the STA 2, a reserved timeslot in the timeslot arrangement information is updated to 12:30, that is, the STA 1 and the STA 2 need to execute the timeslot arrangement information together at 12:30.

Assuming that the STA 1 receives the timeslot arrangement information at 12:10, the STA 1 can return information to the AP in response to receiving the timeslot arrangement information; and the STA 2 receives the timeslot arrangement information at 12:40. In this case, the STA 2 needs to return timeout information to the AP, so that the AP can regenerate and broadcast timeslot arrangement information.

In addition, scheduling of the devices needs to be triggered by a local hardware timer. Based on the timeslot arrangement information delivered in a unified manner, a device determines whether the device is authorized in each timeslot, that is, whether the current timeslot belongs to the device, to determine whether to send data in the current timeslot. In addition, based on a high-precision synchronous time between devices, scheduling synchronization between devices is performed periodically, so that only one device sends data at each moment.

For example, a networking topology of devices may be shown in FIG. 4, where device uids that can be obtained based on FIG. 4 may be shown in the following Table 1.

TABLE 1

| Device | AP | STA 1 | STA 2 | STA 3 | STA 4 |
|---|---|---|---|---|---|
| uid | 0 | 1 | 2 | 3 | 4 |

The timeslot arrangement information generated by the AP may be shown in the following Table 2.

TABLE 2

| Arrangement (uid ) | 0 | 1 | 2 | 2 | 3 | 4 |
|---|---|---|---|---|---|---|
| Number | 0 | 1 | 2 | 3 | 4 | 5 |

After the STA 1, the STA 2, the STA 3, and the STA 4 receive the timeslot arrangement information, assuming that a current timing synchronization function (TSF) value is 1501554 μs and that a timeslot length is 4 ms (4000 μs), a current timeslot value may be determined as [1501554±4000]=375, and the timeslot value indicates in which timeslot the current TSF value is. Therefore, a rounding operation needs to be performed herein. A number obtained based on the current timeslot value may be 375 mod 6=3, that is, the current timeslot is scheduled in an arrangement numbered 3. In this case, based on Table 2, it can be determined that a corresponding uid is 2, that is, a device STA 2. Therefore, in the current timeslot, the STA 2 is authorized to send data, and other devices, that is, the STA 1, the STA 3, and the STA 4, need to keep silent.

In addition, due to differences between devices and between environments, scheduling is not synchronized between devices, resulting in an offset. Therefore, scheduling synchronization further needs to be performed.

Specifically, timeslots with fixed timeslot lengths may be replanned based on a TSF of the AP as a time reference, and then scheduling synchronization may be performed periodically. For example, in a $1024^{th}$ timeslot, a current TSF value may be obtained, and a modulo operation may be performed in combination with a timeslot length of 4 ms. In an ideal case, a time deviation obtained through calculation is 0, but due to the difference between devices, a time deviation may be obtained. After the time deviation is obtained, a timeout time of next scheduling may be obtained in an ideal case based on the timeslot length minus the time deviation, and the timeout time of the next scheduling may be used to correct scheduling. Based on a next time of scheduling all devices, scheduling synchronization may be performed and the time deviation can be corrected back.

The wireless resource scheduling method provided in this application may be performed by an apparatus provided in this application, or a processing device such as a server device, a physical host, a vehicle-mounted terminal, or user equipment (UE for short) integrating the apparatus, where the apparatus may be implemented by hardware or software, and the UE may be specifically a terminal device such as a smartphone, a tablet computer, a notebook computer, a palmtop computer, a desktop computer, or a personal digital assistant (PDA for short).

Figure 4:
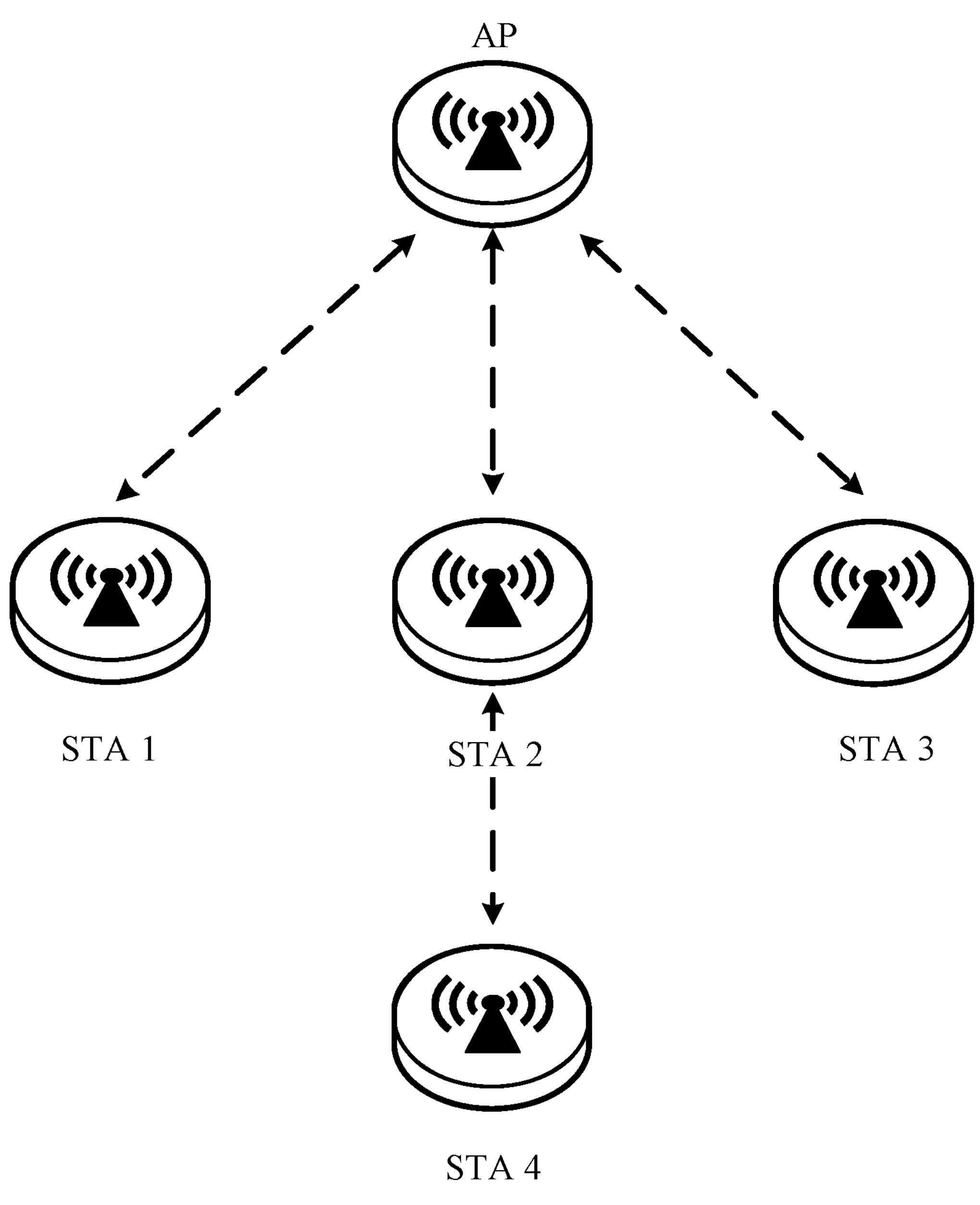
FIG. 4 is a schematic diagram of a networking topology in this application.

An architecture of a time division multiplexing system to which the wireless resource scheduling method provided in this application is applicable may be shown in FIG. 4. The architecture in FIG. 4 includes an AP and a STA 1, a STA 2, a STA 3, and a STA 4. To be specific, in the architecture of the time division multiplexing system, an access device may be the AP, and first stations may be the STA 1, the STA 2, the STA 3, and the STA 4 accessing the AP. The foregoing wireless resource scheduling method may be implemented by using the access device and the first stations, that is, the AP, the STA 1, the STA 2, the STA 3, and the STA 4.

A basic idea of this application is as follows: In view of a problem of hidden nodes, a timeslot allocation mechanism is used to cooperate with switching of wireless medium access priorities, to reduce interference of hidden nodes, ensure QoS, and provide fair medium access, while avoiding a waste of wireless medium resources.

1. The AP allocates working timeslots to different STAs based on a topology and traffic conditions by using a timeslot allocation algorithm, thereby alleviating a collision and ensuring balance between STAs. In addition, a manner of arranging timeslots in advance is used to ensure that a STA can work normally without disorder even when information is lost in a received timeslot.
2. The STA changes, based on a working timeslot, a priority for accessing a wireless medium service. When a scheduled STA has data to transmit, data sending of an unscheduled STA is suppressed and the unscheduled STA keeps silent. When the scheduled STA has no data to transmit, data sending of the unscheduled STA is not suppressed. Therefore, wireless medium resources are not wasted, and real-time performance of a high-priority service is ensured.

The following first describes the wireless resource scheduling method provided in this application.

Figure 5:
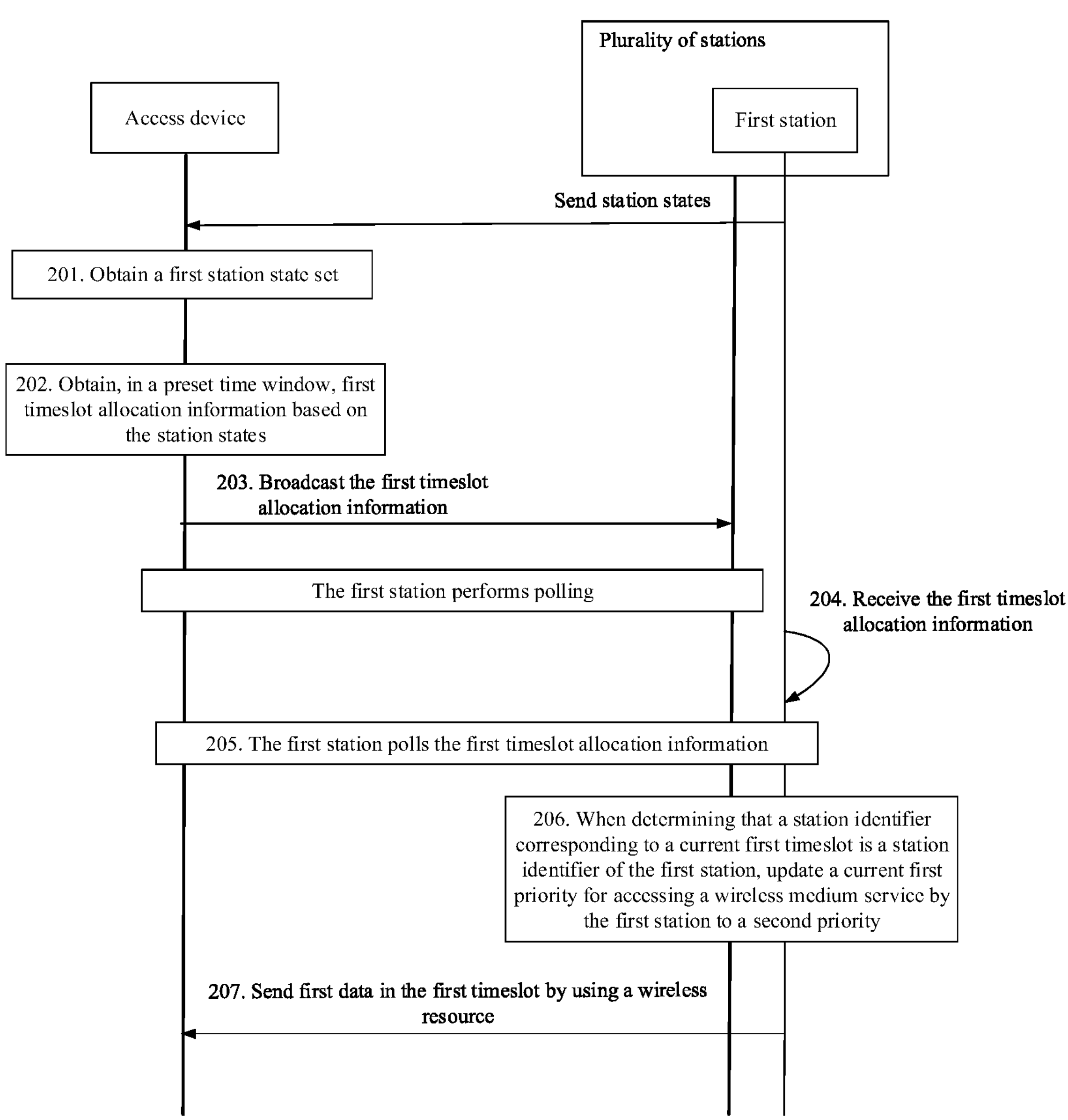
FIG. 5 is a schematic flowchart of a wireless resource scheduling method in this application.

FIG. 5 is a schematic flowchart of a wireless resource scheduling method in this application. The method is applied to wireless resource scheduling in a communications system. The method provided in this application may specifically include the following steps.

201. An access device obtains a first station state set.

The first station state set includes station states of a plurality of stations in a first time window, and the station state of each station may include real-time traffic and a current priority for accessing a wireless medium service.

It may be understood that the access device obtains the station state of each station from the plurality of stations, that is, the access device obtains a station state of a first station from the first station. The first station is any one of the plurality of stations. The same is true for other stations. Details are not described again.

202. The access device obtains, in a preset time window, first timeslot allocation information based on the station states.

The first timeslot allocation information includes timeslot allocation information of the access device for each station for using a wireless resource in at least one time window.

In some implementations, that the access device obtains first timeslot allocation information based on the station states includes:

obtaining a preset mapping relationship, where the preset mapping relationship includes a mapping relationship between a plurality of timeslot parameters, timeslot parameter values corresponding to the plurality of timeslot parameters, and description information of the timeslot parameters; and generating the first timeslot allocation information based on the preset mapping relationship and the station states.

Figure 7:
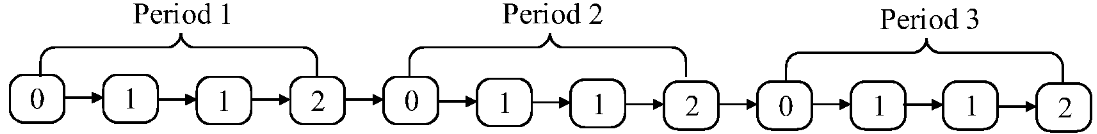
FIG. 7 is a schematic diagram of timeslot arrangement information in this application.

For example, based on STA information of a device management module, an AP periodically generates timeslot arrangement information by using a timeslot allocation algorithm and publishes the information. The timeslot arrangement information is shown in FIG. 7. Information of the timeslot allocation algorithm is shown in the following Table 3.

TABLE 3

| Algorithm parameter | Value | Remark |
|---|---|---|
| Timeslot length | 4 ms | Scheduled available time |
| Timeslot weight | Obtained through calculation by a load balancing module | A high weight for traffic with a high priority |
| Quantity of timeslots | Determined based on a weight and a quantity of interrupts | Quantity of timeslots in a period |
| Quantity of periods | Timeslots are arranged in advance to prevent a packet loss and timeslot arrangement information reception failure | The timeslot arrangement information may include a plurality of periods |
| . . . | . . . | . . . |

It can be learned that by setting the preset mapping relationship, a speed of determining the first timeslot allocation information can be effectively increased, and accuracy of obtaining the first timeslot allocation information can be improved.

In some implementations, the plurality of stations include a first station and a second station, and a priority of the first station is higher than a priority of the second station;

the first timeslot allocation information includes timeslot allocation information for using wireless resources in at least three time windows, the at least three time windows include at least a third time window and a fourth time window, and the fourth time window lags behind the third time window;

a quantity of timeslots occupied by the first station in each time window is larger than a quantity of timeslots occupied by the second station in each time window; and a time domain position of the first station in the third time window corresponds to a time domain position of the first station in the fourth time window, and a time domain position of the second station in the third time window corresponds to a time domain position of the second station in the fourth time window.

Optionally, the at least three time windows may include a second time window, the third time window, and the fourth time window. There are four time windows in total, including the first time window in the foregoing embodiment. Specifically, in the first time window, each station can send data and report its own information to the access device, that is, the station state (such as real-time traffic). In the second time window, the access device obtains the first timeslot allocation information based on the station state of each station and broadcasts the first timeslot allocation information to the stations, respectively before the second time window ends. The broadcast first timeslot allocation information includes timeslots in the third time window and the fourth time window. To be specific, after receiving the first timeslot allocation information, each station can send data in corresponding timeslots in the third time window and the fourth time window.

FIG. 7 is a schematic diagram of the first timeslot allocation information. For example, the time window is a period. In each period, a scheduling order of wireless resources is 0→1→1→2 for STAs corresponding to IDs, where a STA with an ID 1 has a greater weight than other STAs and occupies two timeslots in one period. A quantity of timeslots is 4 and a quantity of periods is 3. For example, as shown in FIG. 7, #1 in a period 1 corresponds to #1 in a period 2 and a period 3, and time domain positions (such as timeslots) in each period are distributed according to this rule. This indicates distribution of time domain positions of wireless resources used by each station in each repetition period. Because the first station has a high priority, and there are only four time domain positions in a period, the first station needs to occupy at least two time domain positions to reflect a priority advantage of the first station.

203. The access device broadcasts the first timeslot allocation information to the stations, respectively.

It may be understood that, the access device sends the first timeslot allocation information to each station that has established a communication connection to the access device and that is in a normal communication state. These stations perform channel polling periodically or aperiodically to obtain the first timeslot allocation information. In this embodiment of this application, an example in which the first station (the station that has established a communication connection to the access device and that is in a normal communication state) receives the first timeslot allocation information through polling is used, and the same is true for other stations. Details are not described again.

After the AP generates the timeslot arrangement information, the information is sent by broadcast. Based on the timeslot length and the quantity of timeslots, it can be known that the timeslot arrangement information is generated and published again after 4 ms*4=16 ms.

204. The first station receives the first timeslot allocation information from the access device.

The first timeslot allocation information includes timeslot allocation information of the access device for each station for using a wireless resource in at least one time window.

After TDMA access of the STA, the AP periodically publishes the timeslot arrangement information, and the STA periodically polls the timeslot arrangement information. A normal priority for accessing the wireless medium service by the STA is a lowest priority. When only a current timeslot belongs to the STA, the priority for accessing the wireless medium service is increased by changing an EDCA parameter.

Figure 6:
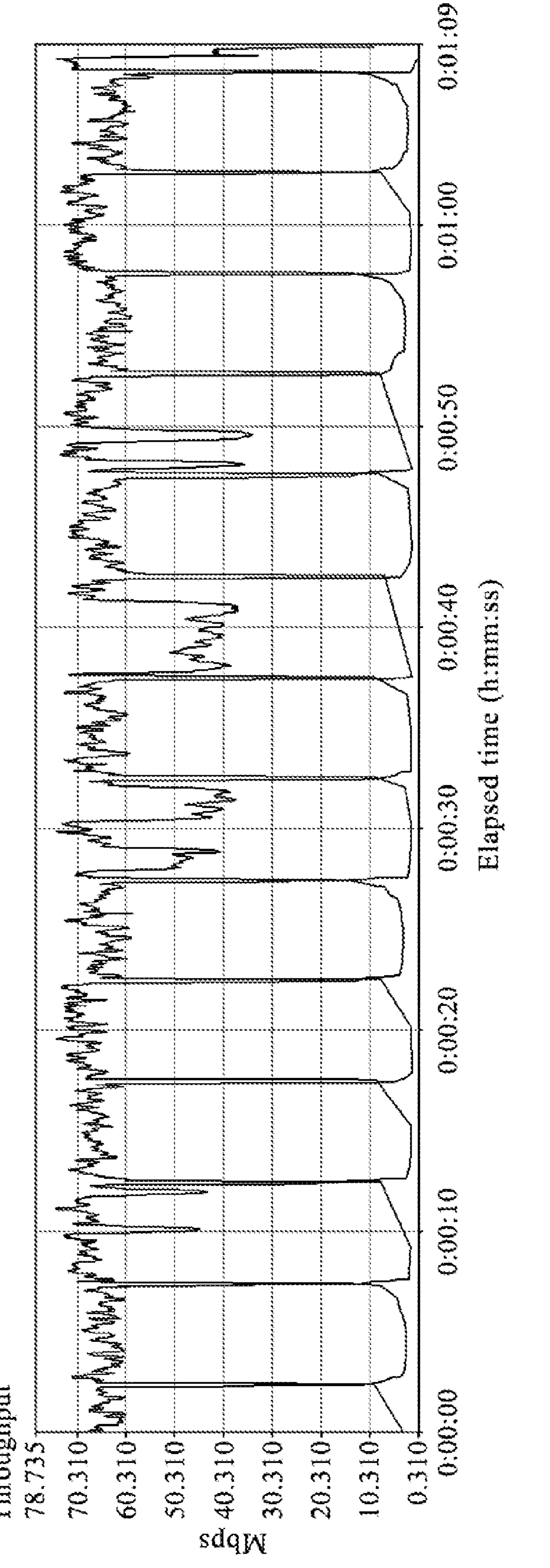
FIG. 6 is a schematic diagram of a throughput test in this application.

A low-priority device has far fewer opportunities to obtain a wireless medium resource than a high-priority device, even cannot obtain a wireless medium resource, and is completely suppressed and in a silent state. FIG. 6 shows an IxChariot throughput test.

The STA updates local arrangement information after receiving the timeslot arrangement information. The STA periodically polls the timeslot arrangement information to determine whether an ID corresponding to the current timeslot is the same as an ID of the STA, and if yes, increases the priority for accessing the wireless medium service, that is, improves a capability of contending for the wireless medium, or if no, reduces the priority for accessing the wireless medium service, that is, reduces a capability of contending for the wireless medium.

205. The first station polls the first timeslot allocation information.

206. When determining that a station identifier corresponding to a current first timeslot is a station identifier of the first station, the first station updates a current first priority for accessing the wireless medium service by the first station to a second priority.

The second priority is higher than the first priority.

207. The first station sends first data in the first timeslot by using the wireless resource.

It may be understood that when the first station uses the wireless resource, the priority of the first station is high, and only the first station can use the wireless resource to send data in the first timeslot. Alternatively, other stations (such as the second station) can also send data in the first timeslot, but can use the wireless resource to send only a small amount of data.

In some other implementations, after the first station polls the first timeslot allocation information, the method further includes:

when determining that a station identifier corresponding to a current second timeslot is not the station identifier of the first station, the first station updates the current second priority for accessing the wireless medium service by the first station to the first priority; and the first station sends second data in the second timeslot without using the wireless resource or by using the wireless resource, where a ratio of a size of the second data to a size of the first data is less than a preset value.

Figure 8:
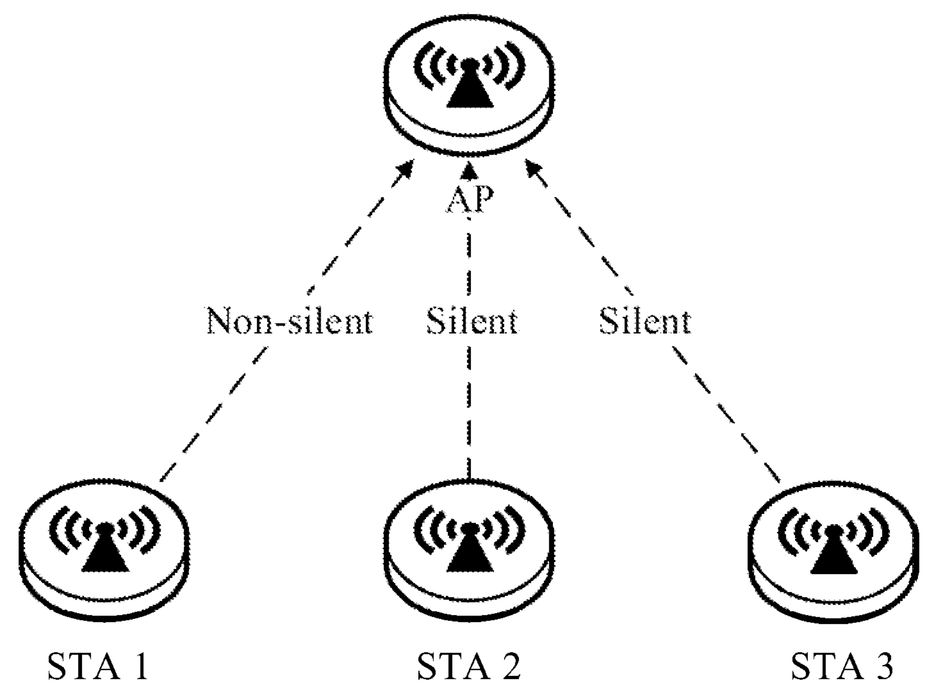
FIG. 8 is a schematic diagram of a station silence situation in this application.

For example, as shown in FIG. 8, the STA 1 has a high priority, and the STA 2 and the STA 3 have low priorities. The low-priority STAs are suppressed by the high-priority STA and cannot send data or can send only a small amount of data. In this way, an effect of silence can be achieved and an interference problem of hidden nodes can be alleviated.

In this embodiment of this application, after the access device obtains the first station state set of the station states in the first time window from the plurality of stations, the access device obtains, in the preset time window, the first timeslot allocation information based on the station states, and the access device broadcasts the first timeslot allocation information to the stations, respectively. Because the first timeslot allocation information includes the timeslot allocation information of the access device for each station for using the wireless resource in the at least one time window, after each station (for example, the first station) obtains the first timeslot allocation information through polling, the station can use the wireless resource to send data in a timeslot allocated to the station. In the timeslot in which the first station sends data, other stations (for example, the second station) can use the wireless resource to send only a small amount of data or cannot use the wireless resource to send data. Therefore, in this wireless resource scheduling manner, the time for each station to use the wireless resource can be properly scheduled, and communication interference from other stations can be avoided when the first station sends data in the timeslot of the first station.

In some implementations, the access device may determine, based on the timeslot allocation information for each station for using the wireless resource in the at least one time window, schedule arrangement information corresponding to each timeslot. The schedule arrangement information includes a receiving station and a sending station corresponding to the corresponding timeslot.

Figures 9, 10, 11:
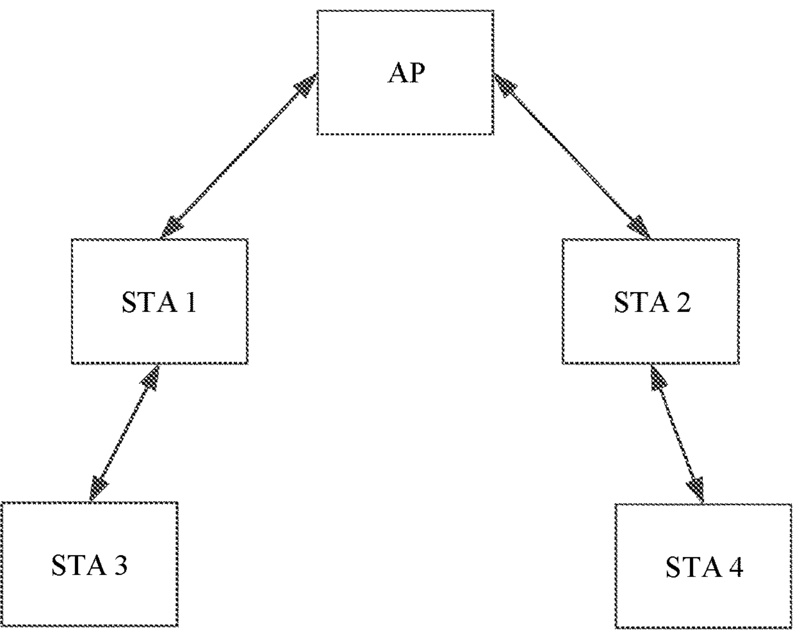
FIG. 9 is a schematic diagram of another networking topology in this application.
FIG. 10 is a schematic diagram of timeslot allocation information in this application.
FIG. 11 is a schematic diagram of a first arrangement table in this application.

For example, assuming that there are a total of four stations including the STA 1, the STA 2, the STA 3, and the STA 4, a networking topology of the STA 1, the STA 2, the STA 3, and the STA 4 and the access device AP may be shown in FIG. 9. In FIG. 9, an upper-level station of the STA 3 is the STA 1, an upper-level station of the STA 4 is the STA 2, an upper-level station of the STA 1 is the AP, and an upper-level station of the STA 2 is the AP.

The AP may obtain, based on the station state of each of the STA 1, the STA 2, the STA 3, and the STA 4, timeslot allocation information for each station for using a wireless resource in at least one time window, where timeslot allocation information for each station in one time window may be shown in FIG. 10. In FIG. 10, the STA 3 sends data in a first timeslot, the STA 1 sends data in a second timeslot, the STA 1 sends data in a third timeslot, the STA 4 sends data in a fourth timeslot, the STA 2 sends data in a fifth timeslot, and the STA 2 sends data in a sixth timeslot.

Based on the timeslot allocation information for each station in FIG. 10, schedule arrangement information corresponding to each timeslot as shown in FIG. 11 may be determined. As shown in FIG. 11, in schedule arrangement information 1, a sending station is the STA 3 and a receiving station is the STA 1, that is, in the schedule arrangement information, the STA 3 sends data and the STA 1 receives data; in schedule arrangement information 2, a sending station is the STA 1 and a receiving station is the AP, that is, in the schedule arrangement information, the STA 1 sends data and the AP receives data; in schedule arrangement information 3, a sending station is the STA 1 and a receiving station is the AP, that is, in the schedule arrangement information, the STA 1 sends data and the AP receives data; in schedule arrangement information 4, a sending station is the STA 4 and a receiving station is the STA 2, that is, in the schedule arrangement information, the STA 4 sends data and the STA 2 receives data; in schedule arrangement information 5, a sending station is the STA 2 and a receiving station is the AP, that is, in the schedule arrangement information, the STA 2 sends data and the AP receives data; and in schedule arrangement information 6, a sending station is the STA 2 and a receiving station is the AP, that is, in the schedule arrangement information, the STA 2 sends data and the AP receives data.

After obtaining a plurality of pieces of schedule arrangement information, the access device may sort the plurality of pieces of schedule arrangement information by timeslots in the timeslot allocation information to obtain a first arrangement table, and sort the plurality of pieces of schedule arrangement information in the first arrangement table by station addresses of the receiving stations corresponding to the timeslots to obtain a second arrangement table.

Optionally, the station addresses of the receiving stations may be MAC addresses of the receiving stations.

For example, the access device sorts the plurality of pieces of schedule arrangement information by the timeslots in the timeslot allocation information, and the obtained first arrangement table may be shown in FIG. 11. Assuming that the receiving stations are sorted by the station addresses of the receiving stations in FIG. 11, the STA 1, the STA 2, and the AP may be obtained. In this case, the plurality of pieces of schedule arrangement information in the first arrangement table are sorted by the station addresses of the receiving stations corresponding to the timeslots, and the obtained second arrangement table may be shown in FIG. 12. Herein, to enable a plurality of different stations to simultaneously send packets in a same timeslot, that is, to send data concurrently, it is required that the corresponding receiving stations in the plurality of schedule arrangement information inclusive of the sending stations are different and that the sending stations cannot collide with each other. Therefore, sorting by the station addresses of the receiving stations can be performed to facilitate subsequent merging of schedule arrangement information.

In an embodiment, alternatively, the plurality of pieces of schedule arrangement information in the first arrangement table may be sorted by device serial numbers of the receiving stations corresponding to the timeslots, so that the second arrangement table is obtained;

first piece of schedule arrangement information on which no merger decision is performed in the current second arrangement table is determined, a merger decision is performed on the first piece of schedule arrangement information, and whether to-be-merged schedule arrangement information meeting a specified condition exists in other schedule arrangement information after the first piece of schedule arrangement information is determined;

when it is determined that the to-be-merged schedule arrangement information exists, the first piece of schedule arrangement information and the to-be-merged schedule arrangement information are removed from the second arrangement table as a group of target schedule arrangement information, where a group of target schedule arrangement information includes at least two pieces of schedule arrangement information; and the foregoing steps are repeated until only one first piece of schedule arrangement information or no first piece of schedule arrangement information on which no merger decision is performed exists in the current second arrangement table.

Specifically, the first piece of schedule arrangement information is sequentially compared with the other schedule arrangement information after the first piece of schedule arrangement information, and when a first piece of target other schedule arrangement information meeting the specified condition is determined from the other schedule arrangement information, it is determined that the to-be-merged schedule arrangement information meeting the specified condition exists in the other schedule arrangement information, and the target other schedule arrangement information is used as the to-be-merged schedule arrangement information; or when the first piece of schedule arrangement information is sequentially compared with the other schedule arrangement information after the first piece of schedule arrangement information, and one piece of target other schedule arrangement information meeting the specified condition is determined from the other schedule arrangement information, it is determined that the to-be-merged schedule arrangement information meeting the specified condition exists in the other schedule arrangement information; or the first piece of schedule arrangement information is separately compared with the other schedule arrangement information after the first piece of schedule arrangement information, and when at least one piece of target other schedule arrangement information meeting the specified condition is determined from the other schedule arrangement information, it is determined that the to-be-merged schedule arrangement information meeting the specified condition exists in the other schedule arrangement information, and the at least one piece of target other schedule arrangement information is used as the to-be-merged schedule arrangement information.

Meeting the specified condition is: a receiving station in the other schedule arrangement information is different from a receiving station in the first piece of schedule arrangement information, and a sending station in the other schedule arrangement information is not a neighboring station of the receiving station in the first piece of schedule arrangement information; or a receiving station in the other schedule arrangement information is different from a receiving station in the first piece of schedule arrangement information, and a sending station in the other schedule arrangement information is a neighboring station of the receiving station in the first piece of schedule arrangement information, and signal strength of the neighboring station is not higher than a specified threshold. When the sending station in the other schedule arrangement information is the neighboring station of the receiving station in the first piece of schedule arrangement information, a signal sent by the sending station in the other schedule arrangement information is received by the receiving station in the first piece of schedule arrangement information, causing signal interference. It should be understood that, when strength of the signal sent by the sending station in the other schedule arrangement information is so low (not higher than a specified threshold) that the current receiving station cannot receive the signal (the sending station and the receiving station are neighboring stations), the sending station in the other schedule arrangement information and the receiving station in the first piece of schedule arrangement information do not interfere each other and also meet the specified condition.

The specified condition is to find schedule arrangement information that does not conflict with the first piece of schedule arrangement information from the other schedule arrangement information, so that a sending station in the found target schedule arrangement information can send data concurrently with the sending station in the first piece of schedule arrangement information.

A basis of the specified condition is: there is no conflict with each other, strength of signals that can be received between every two sending stations that can concurrently send data is not high or the sending stations cannot receive the signals, and the receiving stations in the plurality of pieces of schedule arrangement information inclusive of the sending stations are different from each other.

The neighboring station of the receiving station is a sending station whose station information can be received by the receiving station. For example, a structure of the networking topology may be shown in FIG. 9. In addition, when the STA 1 is a receiving station, the STA 1, the STA 2, the STA 3, and the STA 4 may all serve as sending stations. Assuming that the receiving station STA 1 can receive station information sent by the sending station STA 2 and the sending station STA 3 separately, but cannot receive station information sent by the sending station STA 4, the sending station STA 2 and the sending station STA 3 may be used as neighboring stations of the receiving station STA 1. In addition, because the sending station STA 1 and the receiving station STA 1 are the same station, the sending station STA 1 may also be used as a neighboring station of the receiving station STA 1.

The specified threshold may be adjusted based on an actual situation, and may be set to −90 dBm in this embodiment.

For example, FIG. 12 shows the current second arrangement table. Schedule arrangement information 1 is compared with the following five pieces of schedule arrangement information sequentially or separately. Assuming that receiving stations in schedule arrangement information 3, schedule arrangement information 4, schedule arrangement information 5, and schedule arrangement information 6 are all different from a receiving station in schedule arrangement information 1, and that sending stations in schedule arrangement information 3, schedule arrangement information 4, schedule arrangement information 5, and schedule arrangement information 6 are all neighboring stations of the receiving station in schedule arrangement information 1, it may be determined that none of schedule arrangement information 3, schedule arrangement information 4, schedule arrangement information 5, and schedule arrangement information 6 is to-be-merged schedule arrangement information. However, the receiving station in schedule arrangement information 2 is different from the receiving station in schedule arrangement information 1, and the sending station in schedule arrangement information 2 is not a neighboring station of the receiving station in schedule arrangement information 1. In this case, it may be determined that schedule arrangement information 2 is to-be-merged schedule arrangement information, and schedule arrangement information 1 and schedule arrangement information 2 are used as a group of target schedule arrangement information, and then schedule arrangement information 1 and schedule arrangement information 2 are removed from the current second arrangement table.

Based on the foregoing processing, the current second arrangement table includes schedule arrangement information 3, schedule arrangement information 4, schedule arrangement information 5, and schedule arrangement information 6. Schedule arrangement information 3 is compared with the following three pieces of schedule arrangement information sequentially or separately. Because receiving stations in schedule arrangement information 4, schedule arrangement information 5, and schedule arrangement information 6 are all the same as the receiving station in schedule arrangement information 3, it may be determined that none of schedule arrangement information 4, schedule arrangement information 5, and schedule arrangement information 6 is to-be-merged schedule arrangement information.

Based on the foregoing processing, the current second arrangement table includes schedule arrangement information 4, schedule arrangement information 5, and schedule arrangement information 6. Schedule arrangement information 4 is compared with the following two pieces of schedule arrangement information sequentially or separately. Because receiving stations in schedule arrangement information 5 and schedule arrangement information 6 are both the same as the receiving station in schedule arrangement information 4, it may be determined that neither schedule arrangement information 5 nor schedule arrangement information 6 is to-be-merged schedule arrangement information.

Based on the foregoing processing, the current second arrangement table includes schedule arrangement information 5 and schedule arrangement information 6. Schedule arrangement information 5 is compared with the following schedule arrangement information 6. Because the receiving station in schedule arrangement information 6 is the same as that in schedule arrangement information 5, it may be determined that schedule arrangement information 6 is not to-be-merged schedule arrangement information.

When it is determined that at least one group of target schedule arrangement information meeting the specified condition exists in the plurality of pieces of schedule arrangement information, timeslots in at least two pieces of schedule arrangement information in each group of target schedule arrangement information are merged.

Timeslots are re-allocated based on a result of merging each group of target schedule arrangement information, to obtain the first timeslot allocation information. To be specific, timeslots are re-allocated for the plurality of pieces of schedule arrangement information based on a time sequence of timeslots corresponding to each merged group of target schedule arrangement information and timeslots corresponding to unmerged schedule arrangement information, to obtain the first timeslot allocation information.

That the timeslots are re-allocated based on the result of merging each group of target schedule arrangement information, to obtain the first timeslot allocation information includes two cases.

In a first case, when timeslots in at least two pieces of schedule arrangement information in each group of target schedule arrangement information are merged, when all timeslots in the schedule arrangement information can be merged, that is, there is no unmerged schedule arrangement information in the plurality of pieces of schedule arrangement information, timeslots may be re-allocated only based on the result of merging each group of target schedule arrangement information, to obtain the first timeslot allocation information.

In a second case, when timeslots in at least two pieces of schedule arrangement information in each group of target schedule arrangement information are merged, when some timeslots in the schedule arrangement information can be merged and some timeslots in the schedule arrangement information cannot be merged, that is, there is unmerged schedule arrangement information in the plurality of pieces of schedule arrangement information, timeslots may be re-allocated based on the result of merging each group of target schedule arrangement information and the unmerged schedule arrangement information, to obtain the first timeslot allocation information.

For example, the arrangement table includes eight pieces of schedule arrangement information in total: schedule arrangement information 1, schedule arrangement information 2, schedule arrangement information 3, schedule arrangement information 4, schedule arrangement information 5, schedule arrangement information 6, schedule arrangement information 7, and schedule arrangement information 8, where schedule arrangement information 1 corresponds to a first timeslot, schedule arrangement information 2 corresponds to a second timeslot, schedule arrangement information 3 corresponds to a third timeslot, schedule arrangement information 8 corresponds to an eighth timeslot.

Assuming that based on the performed merger decision, it may be determined that schedule arrangement information 1, schedule arrangement information 3, and schedule arrangement information 5 are a group of target schedule arrangement information, and that schedule arrangement information 2 and schedule arrangement information 6 are a group of target schedule arrangement information, timeslots in schedule arrangement information 1, schedule arrangement information 3, and schedule arrangement information 5 can be merged, so that schedule arrangement information 1, schedule arrangement information 3, and schedule arrangement information 5 correspond to a same timeslot, and timeslots in schedule arrangement information 2 and schedule arrangement information 6 can be merged, so that schedule arrangement information 2 and schedule arrangement information 6 correspond to a same timeslot.

After the merger, it may be determined that schedule arrangement information 1, schedule arrangement information 2, schedule arrangement information 3, schedule arrangement information 4, schedule arrangement information 5, schedule arrangement information 6, schedule arrangement information 7, and schedule arrangement information 8 correspond to five timeslots in total. In this case, timeslots may be re-allocated for the eight pieces of schedule arrangement information based on a time sequence of timeslots corresponding to the schedule arrangement information, to obtain schedule arrangement information 1 corresponding to the first timeslot, schedule arrangement information 2 corresponding to the second timeslot, schedule arrangement information 3 corresponding to the first timeslot, schedule arrangement information 4 corresponding to the third timeslot, schedule arrangement information 5 corresponding to the first timeslot, schedule arrangement information 6 corresponding to the second timeslot, schedule arrangement information 7 corresponding to the fourth timeslot, and schedule arrangement information 8 corresponding to the fifth timeslot.

In an embodiment, when it is determined that at least one group of target schedule arrangement information meeting the specified condition exists in the plurality of pieces of schedule arrangement information, timeslots in at least two pieces of schedule arrangement information in each group of target schedule arrangement information may be further merged into a timeslot earliest in time in this group of target schedule arrangement information, and then timeslots are re-allocated based on the result of merging each group of target schedule arrangement information, to obtain the first timeslot allocation information.

For example, assuming that a group of target schedule arrangement information includes three pieces of schedule arrangement information A, B and C, where a timeslot corresponding to A is 1, a timeslot corresponding to B is 4, and a timeslot corresponding to C is 5, timeslots corresponding to B and C may be merged into the timeslot corresponding to A, that is, after being merged, the timeslots corresponding to A, B and C are all 1. Assuming that a group of target schedule arrangement information includes two pieces of schedule arrangement information D and E, where a timeslot corresponding to D is 3 and a timeslot corresponding to E is 6, the timeslot corresponding to E may be merged into the timeslot corresponding to D, that is, after being merged, timeslots corresponding to D and E are both 3.

The following describes the foregoing solution by using two specific embodiments.

Embodiment 1: Assuming that the first arrangement table includes seven pieces of schedule arrangement information A, B, C, D, E, F, and G, where a timeslot corresponding to A is 1, a timeslot corresponding to B is 2, a timeslot corresponding to C is 3, a timeslot corresponding to D is 4, a timeslot corresponding to E is 5, a timeslot corresponding to F is 6, and a timeslot corresponding to G is 7, after a merger decision is performed, it may be determined that A, D, and E are a group of target schedule arrangement information, and that B and G are a group of target schedule arrangement information. In this case, the timeslots corresponding to D and E may be merged into the timeslot corresponding to A, and the timeslot corresponding to G may be merged into the timeslot corresponding to B. After the merger, the following may be obtained: A timeslot corresponding to A, D, and E is 1, a timeslot corresponding to B and G is 2, a timeslot corresponding to C is 3, a timeslot corresponding to F is 6, and a total quantity of timeslots is 4. In this case, timeslots are re-allocated for the seven pieces of schedule arrangement information based on a time sequence of timeslots corresponding to the schedule arrangement information, and the obtained first timeslot allocation information is: a timeslot corresponding to A, D, and E is 1, a timeslot corresponding to B and G is 2, a timeslot corresponding to C is 3, and a timeslot corresponding to F is 4.

Embodiment 2: Assuming that the first arrangement table includes eight pieces of schedule arrangement information A, B, C, D, E, F, G, and H, where a timeslot corresponding to A is 1, a timeslot corresponding to B is 2, a timeslot corresponding to C is 3, a timeslot corresponding to D is 4, a timeslot corresponding to E is 5, a timeslot corresponding to F is 6, a timeslot corresponding to G is 7, and a timeslot corresponding to H is 8, after a merger decision is performed, it may be determined that A, C, and E are a group of target schedule arrangement information, and that B, D, and F are a group of target schedule arrangement information. In this case, the timeslots corresponding to C and E may be merged into the timeslot corresponding to A, and the timeslots corresponding to D and F may be merged into the timeslot corresponding to B. After the merger, the following may be obtained: A timeslot corresponding to A, C, and E is 1, a timeslot corresponding to B, D, and F is 2, a timeslot corresponding to G is 7, a timeslot corresponding to H is 8, and a total quantity of timeslots is 4. In this case, timeslots are re-allocated for the eight pieces of schedule arrangement information based on a time sequence of timeslots corresponding to the schedule arrangement information, and the obtained first timeslot allocation information is: a timeslot corresponding to A, C, and E is 1, a timeslot corresponding to B, D, and F is 2, a timeslot corresponding to G is 3, and a timeslot corresponding to H is 4.

For example, based on the performed merger decision, it may be obtained that schedule arrangement information 1 and schedule arrangement information 4 in FIG. 11 are a group of target schedule arrangement information. In this case, the timeslots in schedule arrangement information 1 and schedule arrangement information 4 may be merged into the timeslot in schedule arrangement information 1, that is, the timeslots in schedule arrangement information 1 and schedule arrangement information 4 are both the first timeslot.

After the merger, the following may be obtained: The timeslots corresponding to schedule arrangement information 1 and schedule arrangement information 4 are the first timeslot, the timeslot corresponding to schedule arrangement information 2 is the second timeslot, the timeslot corresponding to schedule arrangement information 3 is the third timeslot, the timeslot corresponding to schedule arrangement information 5 is the fifth timeslot, and the timeslot corresponding to schedule arrangement information 6 is the sixth timeslot, that is, the six pieces of schedule arrangement information correspond to five timeslots. In this case, timeslots may be re-allocated for the six pieces of schedule arrangement information based on a time sequence of timeslots corresponding to the schedule arrangement information, to obtain a target arrangement table as shown in FIG. 13. In FIG. 13, timeslots in schedule arrangement information 1 and schedule arrangement information 4 are the first timeslot, a timeslot in schedule arrangement information 2 is the second timeslot, a timeslot in schedule arrangement information 3 is the third timeslot, a timeslot in schedule arrangement information 5 is the fourth timeslot, and a timeslot in schedule arrangement information 6 is the fifth timeslot.

Figure 14:
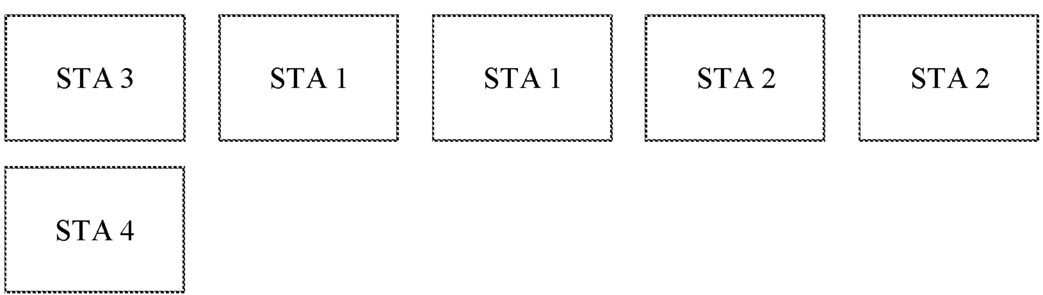
FIG. 14 is a schematic diagram of first timeslot allocation information in this application.

Further, based on the target arrangement table, the obtained first timeslot allocation information may be shown in FIG. 14. In FIG. 14, the STA 3 and the STA 4 can send data concurrently in a same timeslot.

In some implementations, after each station is successfully associated with an upper-level station, the station may send station information to the access device, where the station information may include a MAC address of the station and a MAC address of the upper-level station, associated with the station. Each station can also receive signals from nearby stations, generate nearby station information, and periodically send the nearby station information to the access device, where the nearby station information may include MAC addresses and signal strength of the nearby stations.

After receiving the station information sent by each station, the access device may determine the networking topology of each station, and determine, based on the networking topology and the station state of each station, timeslot allocation information for each station for using a wireless resource in at least one time window.

Figure 15:
FIG. 15 is another schematic diagram of timeslot allocation information in this application.

For example, after receiving the station information sent by each station, the access device determines that the networking topology of each station is shown in FIG. 9, and then may obtain the timeslot allocation information shown in FIG. 10. Based on the station state of each station, the access device may determine that real-time traffic of the STA 1 is heavy, and may allocate one more timeslot to the STA 1, to obtain the timeslot allocation information shown in FIG. 15.

In some other implementations, after the networking topology of each station becomes stable, the access device may determine non-colliding sending stations in the networking topology based on the nearby station information sent by each station, merge timeslot allocation information corresponding to the non-colliding sending stations, generate the first timeslot allocation information, and broadcast the first timeslot allocation information to the stations, respectively.

A condition of a stable networking topology may be that the networking topology has not changed within a specified time threshold, where the specified time threshold may be adjusted based on an actual situation, and may be set to 1 minute in this embodiment.

Specifically, a process of determining the non-colliding sending stations in the networking topology may be as follows.

1. After obtaining the first arrangement table, arrange all the schedule arrangement information in the first arrangement table based on station addresses of the receiving stations to obtain the second arrangement table.
2. Make a copy of the second arrangement table and name the copy "second arrangement table_1".
3. Traverse the second arrangement table_1 in sequence, and starting from the first piece of non-traversed schedule arrangement information, extract the first piece of non-traversed schedule arrangement information.

(1) Name the extracted schedule arrangement information first schedule arrangement information.

(2) Determine a receiving station and a sending station in the first schedule arrangement information.

4. Make a copy of all content in the second arrangement table_1 except the first schedule arrangement information, and name the copy "second arrangement table_2".
5. Continue to traverse content in the second arrangement table_2 from the beginning, and perform the following operations on each piece of schedule arrangement information in the second arrangement table_2, that is, extract the schedule arrangement information in the second arrangement table_2 piece by piece and perform the following operations.
(1) When there is no content in the second arrangement table_2 in this case, end the traversal and return "search fails".
(2) When there is content in the second arrangement table_2, the extracted schedule arrangement information is named "second schedule arrangement information".
(3) Obtain a sending station and a receiving station in the second schedule arrangement information.
(4) When the receiving node in the second schedule arrangement information is the same as the receiving node in the first schedule arrangement information, it indicates that the second schedule arrangement information conflicts with the first schedule arrangement information in packet reception. In this case, put the second schedule arrangement information back to an original position in the second arrangement table_2, and continue to traverse remaining content.
(5) When the sending node in the second schedule arrangement information appears in a neighbor information table of the receiving node in the first schedule arrangement information, and signal strength is higher than the specified threshold, it indicates that packet sending of the sending node in the second schedule arrangement information affects packet reception of the receiving node in the first schedule arrangement information. Therefore, put the second schedule arrangement information back to the original position in the second arrangement table_2, and continue to traverse the remaining content.
(6) When the second schedule arrangement information meets a requirement, that is, the conditions in the foregoing steps (4) and (5) are not hit, end the search and return "search succeeds".
(7) Repeat the foregoing steps (1) to (6) until the search is finished or the search succeeds.
6. When returning "search succeeds", remove the first schedule arrangement information and the second schedule arrangement information from the second arrangement table_1, continue to perform traversal, add the first schedule arrangement information and the second schedule arrangement information to a merger table, and allocate a merger ID.
7. When returning "search fails", put the first schedule arrangement information back to the original position in the second arrangement table_1, and continue to perform traversal until all schedule arrangement information is traversed.

The sending time of each station is staggered, that is, all stations occupy a data transmission time of an air interface exclusively. However, actually, for stations without signal collisions, data can be sent concurrently.

Therefore, in this embodiment of this application, after the access device determines, based on the timeslot allocation information for each station for using the wireless resource in the at least one time window, the schedule arrangement information corresponding to each timeslot, the access device can determine whether at least one group of target schedule arrangement information meeting the specified condition exists in the plurality of pieces of schedule arrangement information, and can find non-colliding stations that can send data concurrently among the stations.

In addition, when determining that the at least one group of target schedule arrangement information exists, the access device can merge the timeslots in the at least two pieces of schedule arrangement information in each group of target schedule arrangement information, so that the non-colliding stations that can send data concurrently can send data in a same timeslot.

In addition, the access device may further re-allocate timeslots for the plurality of pieces of schedule arrangement information based on the time sequence of the timeslots corresponding to each merged group of target schedule arrangement information and the timeslots corresponding to the unmerged schedule arrangement information, to obtain the first timeslot allocation information, to reduce the sending time of the non-colliding stations that can send data concurrently among the stations and further improve throughput of the entire system.

In some embodiments of this application, the access device may further periodically or randomly update the timeslot allocation information. In this embodiment of this application, periodically updating the timeslot allocation information is used as an example.

The station state of each station includes real-time traffic and the current priority for accessing the wireless medium service, and the method further includes:

the access device receives a second station state set from the stations, where the second station state set includes station states of the plurality of stations in a second time window, and a start time of the second time window lags behind an end time of the first time window; and the access device updates a timeslot weight of each station in the first timeslot allocation information based on the second station state set, where a value of the timeslot weight is in a positive relationship with a priority and/or transmission traffic of the station.

For example, in an embodiment, the value of the timeslot weight of a station may be determined depending on the priority of the station in priority. That is, the higher the priority of the station is, the greater the timeslot weight of the station is.

Additionally, in another embodiment, the value of the timeslot weight of the station may be determined further depending on the real-time transmission traffic of the station. For example, when a station has the same priority as that of another station, the timeslot weight of the station may be determined further depending on the real-time transmission traffic of the station in a positive relationship to more accurately allocate the timeslots.

In yet another embodiment, vice versa, the timeslot weight of a station may be determined depending on the real-time transmission traffic of the station in priority. In addition, when the real-time transmission traffic of two stations are the same, the timeslot weight of the station may be determined further depending on the priority of the station.

It can be learned that updating the timeslot allocation information can avoid the following problem: In long-term fixed timeslot allocation information, some stations may not need to send data, or need to send only a small amount of data, but other stations need to send a large amount of data in some timeslots; and when these situations change, improper allocation of wireless resources in the time period may occur because of the fixed timeslot allocation information. Therefore, to improve utilization of wireless resources in different time periods, in this embodiment of this application, the wireless resource occupation time of each station is updated more properly by updating the timeslot allocation information.

For better implementation of the method of this application, embodiments of this application further provide an access device and a station (the first station in the method embodiment is used as an example, the same is true for other stations, and details are not described again).

Figure 16:
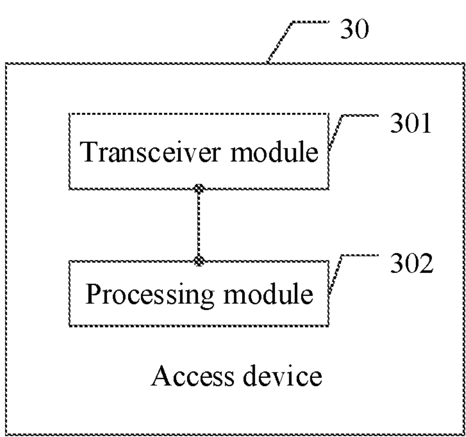
FIG. 16 is a schematic diagram of a structure of an access device in this application.

FIG. 16 is a schematic diagram of a structure of an access device 30 in an embodiment of this application. The access device 30 may specifically include the following structure:

a transceiver module 301, configured to obtain a first station state set, where the first station state set includes station states of a plurality of stations in a first time window; and a processing module 302, configured to obtain, in a preset time window, first timeslot allocation information based on the station states, where the first timeslot allocation information includes timeslot allocation information of the access device for each station for using a wireless resource in at least one time window, where the transceiver module 301 is further configured to broadcast the first timeslot allocation information obtained by the processing module 302 to each station.

In some embodiments, the processing module 302 is specifically configured to:

obtain a preset mapping relationship, where the preset mapping relationship includes a mapping relationship between a plurality of timeslot parameters, timeslot parameter values corresponding to the plurality of timeslot parameters, and description information of the timeslot parameters; and generate the first timeslot allocation information based on the preset mapping relationship and the station states.

In some embodiments, a station state of each station includes real-time traffic and a current priority for accessing a wireless medium service, and the processing module 302 is further configured to:

receive a second station state set from the stations by using the transceiver module 301, where the second station state set includes station states of the plurality of stations in a second time window, and a start time of the second time window lags behind an end time of the first time window; and update a timeslot weight of each station in the first timeslot allocation information based on the second station state set, where a value of the timeslot weight is in a positive relationship with a priority and/or transmission traffic of the station.

In some embodiments, the plurality of stations include a first station and a second station, and a priority of the first station is higher than a priority of the second station;

the first timeslot allocation information includes timeslot allocation information for using wireless resources in at least three time windows, the at least three time windows include at least a third time window and a fourth time window, and the fourth time window lags behind the third time window;

a quantity of timeslots occupied by the first station in each time window is larger than a quantity of timeslots occupied by the second station in each time window; and a time domain position of the first station in the third time window corresponds to a time domain position of the first station in the fourth time window, and a time domain position of the second station in the third time window corresponds to a time domain position of the second station in the fourth time window.

In some embodiments, the processing module 302 is further configured to:

determine, based on the timeslot allocation information for each station for using the wireless resource in the at least one time window, schedule arrangement information corresponding to each timeslot, where the schedule arrangement information includes a receiving station and a sending station corresponding to the corresponding timeslot;

sort a plurality of pieces of obtained schedule arrangement information by timeslots in the timeslot allocation information, to obtain a first arrangement table;

determine whether at least one group of target schedule arrangement information meeting a specified condition exists in the plurality of pieces of schedule arrangement information, where a group of target schedule arrangement information includes at least two pieces of schedule arrangement information;

when the at least one group of target schedule arrangement information exists, merge timeslots in at least two pieces of schedule arrangement information in each group of target schedule arrangement information; and re-allocate timeslots based on a result of merging each group of target schedule arrangement information, to obtain the first timeslot allocation information.

In some embodiments, the processing module 302 is further configured to:

sort the plurality of pieces of schedule arrangement information in the first arrangement table by station addresses of receiving stations corresponding to the timeslots, to obtain a second arrangement table;

determine first piece of schedule arrangement information on which no merger decision is performed in the current second arrangement table, perform a merger decision on the first piece of schedule arrangement information, and determine whether to-be-merged schedule arrangement information meeting the specified condition exists in other schedule arrangement information after the first piece of schedule arrangement information;

when determining that the to-be-merged schedule arrangement information exists, remove, from the second arrangement table, the first piece of schedule arrangement information and the to-be-merged schedule arrangement information as a group of target schedule arrangement information; and repeat the foregoing steps until only one first piece of schedule arrangement information or no first piece of schedule arrangement information on which no merger decision is performed exists in the current second arrangement table.

In some embodiments, the processing module 302 is further configured to:

sequentially compare the first piece of schedule arrangement information with the other schedule arrangement information after the first piece of schedule arrangement information, and when a first piece of target other schedule arrangement information meeting the specified condition is determined from the other schedule arrangement information, determine that the to-bemerged schedule arrangement information meeting the specified condition exists in the other schedule arrangement information; or separately compare the first piece of schedule arrangement information with the other schedule arrangement information after the first piece of schedule arrangement information, and when at least one piece of target other schedule arrangement information meeting the specified condition is determined from the other schedule arrangement information, determine that the to-be-merged schedule arrangement information meeting the specified condition exists in the other schedule arrangement information;

where the meeting the specified condition is: a receiving station in the other schedule arrangement information is different from a receiving station in the first piece of schedule arrangement information, and a sending station in the other schedule arrangement information is not a neighboring station of the receiving station in the first piece of schedule arrangement information; or a receiving station in the other schedule arrangement information is different from a receiving station in the first piece of schedule arrangement information, and a sending station in the other schedule arrangement information is a neighboring station of the receiving station in the first piece of schedule arrangement information, and signal strength of the neighboring station is not higher than a specified threshold.

In some embodiments, the processing module 302 is further configured to:

re-allocate timeslots for the plurality of pieces of schedule arrangement information based on a time sequence of timeslots corresponding to each merged group of target schedule arrangement information and timeslots corresponding to unmerged schedule arrangement information, to obtain the first timeslot allocation information.

In this embodiment of this application, after the transceiver module 301 of the access device 30 obtains the first station state set of the station states in the first time window from the plurality of stations, the processing module 302 of the access device 30 obtains, in the preset time window, the first timeslot allocation information based on the station states, and the access device broadcasts the first timeslot allocation information to the stations, respectively. Because the first timeslot allocation information includes the timeslot allocation information of the access device 30 for each station for using the wireless resource in the at least one time window, after each station (for example, the first station) obtains the first timeslot allocation information through polling, the station can use the wireless resource to send data in a timeslot allocated to the station. In the timeslot in which the first station 40 sends data, other stations (for example, the second station) can use the wireless resource to send only a small amount of data or cannot use the wireless resource to send data. Therefore, in this wireless resource scheduling manner, the time for each station to use the wireless resource can be properly scheduled, and communication interference from other stations can be avoided when the first station sends data in the timeslot of the first station.

Figure 17:
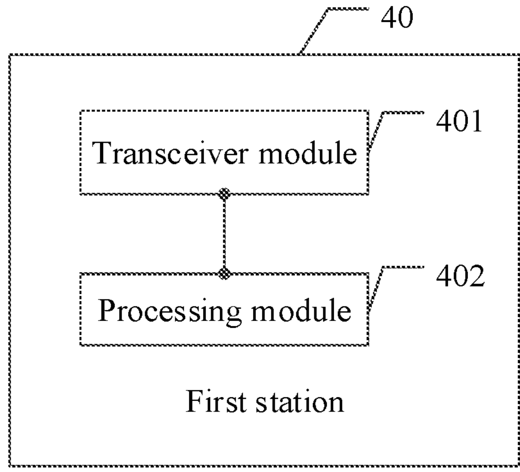
FIG. 17 is a schematic diagram of a structure of a first station implementing a wireless resource scheduling method in this application.

FIG. 17 is a schematic diagram of a structure of a first station 40 in an embodiment of this application. The first station 40 may specifically include the following structure:

a transceiver module 401, configured to receive first timeslot allocation information from an access device, where the first timeslot allocation information includes timeslot allocation information of the access device for each station for using a wireless resource in at least one time window; and a processing module 402, configured to: poll the first timeslot allocation information; and when determining that a station identifier corresponding to a current first timeslot is a station identifier of the first station, update a current first priority for accessing a wireless medium service by the first station to a second priority, where the second priority is higher than the first priority, where the transceiver module 401 is further configured to send first data in the first timeslot by using the wireless resource.

In some embodiments, the processing module 402 is specifically configured to:

obtain, by using the transceiver module 401, an EDCA parameter, and update the EDCA parameter, to update the current first priority for accessing the wireless medium service by the first station to the second priority.

In some embodiments, after polling the first timeslot allocation information, the processing module 402 is further configured to:

when determining that a station identifier corresponding to a current second timeslot is not the station identifier of the first station, update the current second priority for accessing the wireless medium service by the first station to the first priority; and send, by using the transceiver module 401, second data in the second timeslot without using the wireless resource or by using the wireless resource, where a ratio of a size of the second data to a size of the first data is less than a preset value.

In this embodiment of this application, the transceiver module 401 of the first station 40 receives the first timeslot allocation information from the access device 30, where the first timeslot allocation information includes the timeslot allocation information of the access device 30 for each station for using the wireless resource in the at least one time window. Therefore, the processing module 402 of the first station 40 can control the transceiver module 401 to send data by using the wireless resource in a timeslot allocated to the first station. In the timeslot in which the first station 40 sends data, other stations (for example, a second station) can use the wireless resource to send only a small amount of data or cannot use the wireless resource to send data. Therefore, in this wireless resource scheduling manner, the time for each station to use the wireless resource can be properly scheduled, and communication interference from other stations can be avoided when the first station sends data in the timeslot of the first station.

A software system structure of a time division multiplexing system is shown in FIG. 1. FIG. 1 shows a control module, a device management module, a load balancing module, a timer module, and their calling relationships.

1. The control module is responsible for scheduling other modules. At an AP end, the control module allocates working timeslots properly and effectively based on information provided by other modules, and synchronizes timeslot allocation information to a STA end. At the STA end, the control module mainly responds to the received timeslot allocation information, and improves/reduces, based on whether a current timeslot belongs to the STA, a device capability of contending for a wireless medium.

2. The device management module is responsible for access control in time division multiplexing of devices, and unified management of information of devices participating in scheduling.
3. The load balancing module measures real-time traffic and a service priority of each STA, calculates a timeslot weight of the STA according to a related load balancing algorithm, and records the weight in the device management module. The control module generates the timeslot allocation information based on timeslot weight information and synchronizes the timeslot allocation information.
4. The timer module generates a timing interrupt to trigger the control module to respond: publishing timeslots and adjusting a priority for accessing the wireless medium.

Specifically, at the AP end, when the STA accesses the AP, the device management module may be responsible for access control of the STA and unified management of the information of the STAs participating in the scheduling; the load balancing module measures the real-time traffic and the service priority of each access STA, calculates the timeslot weight of the STA according to the related load balancing algorithm, and records the timeslot weight in the device management module, and the control module generates the timeslot allocation information based on the timeslot weight information and synchronizes the timeslot allocation information; the timer module generates the timing interrupt to trigger the control module to respond: publishing the timeslots and adjusting the priority for accessing the wireless medium; and when the timer module generates the timing interrupt, the control module may further allocate working timeslots properly and effectively based on the information provided by the device management module and the load balancing module, and synchronize the timeslot allocation information to the STA end.

At the STA end, the control module responds to the received timeslot allocation information, and determines, based on whether the current timeslot belongs to the STA, whether to send data in the current timeslot, that is, improves/reduces the device capability of contending for the wireless medium.

Figure 18:
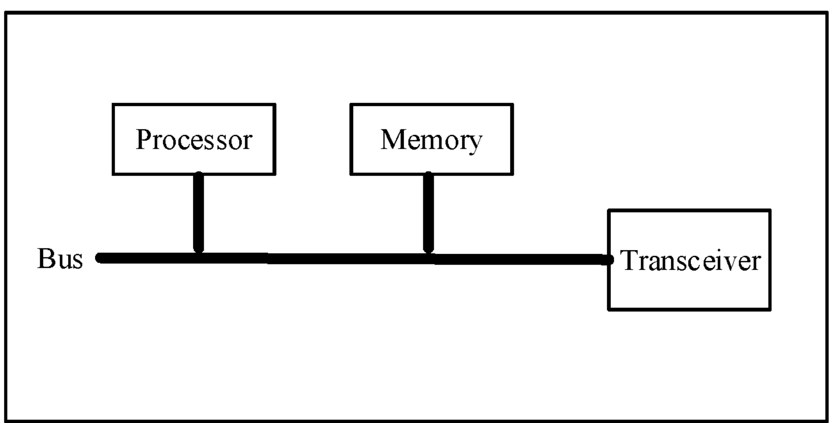
FIG. 18 is a schematic diagram of a structure of a processing device in this application.

This application further provides a processing device. FIG. 18 is a schematic diagram of a structure of a processing device in this application. Specifically, the processing device provided in this application includes a processor. The processor is configured to execute a computer program stored in a memory, to implement the steps in the embodiment corresponding to any one of FIG. 1 to FIG. 15, or the processor is configured to execute a computer program stored in a memory, to implement the function of each module in the embodiment corresponding to FIG. 16 or FIG. 17.

For example, the computer program may be divided into one or more modules/units, and the one or more modules/units are stored in the memory and executed by the processor to complete this application. The one or more modules/units may be a series of computer program instruction segments that can complete specific functions, and the instruction segments are used to describe an execution process of the computer program in a computer apparatus.

The processing device may include, but is not limited to, the processor and the memory. It may be understood by a person skilled in the art that the example is only an example of the processing device, and does not constitute a limitation on the processing device. The processing device may include more or fewer components than those shown in the figure, or some components are combined, or component arrangements are different. For example, the processing device may further include an input/output device, a network access device, a bus, and the like. The processor, the memory, the input/output device, the network access device, and the like are connected by using a bus.

The processor may be a central processing unit (English: Central Processing Unit, CPU for short), or may be another general purpose processor, a digital signal processor (English: Digital Signal Processor, DSP for short), an application specific integrated circuit (English: Application Specific Integrated Circuit, ASIC for short), a field programmable gate array (English: Field-Programmable Gate Array, FPGA for short) or another programmable logic device, a discrete gate or transistor logic device, a discrete hardware component, or the like. The general purpose processor may be a microprocessor, or the processor may be any conventional processor or the like. The processor is a control center of the processing device, and uses various interfaces and lines to connect parts of the entire processing device.

The memory may be configured to store a computer program and/or module. The processor implements various functions of the computer apparatus by running or executing the computer program and/or module stored in the memory and invoking data stored in the memory. The memory may primarily include a program storage area and a data storage area. The program storage area may store an operating system, an application program (such as an audio play function and an image play function) required by at least one function, and the like. The data storage area may store data (such as audio data and video data) created based on use of the processing device. In addition, the memory may include a high-speed random access memory, and may further include a non-volatile memory, for example, a hard disk, a memory, a plug-in hard disk, a Smart Media Card (SMC), a secure digital (English: Secure Digital, SD for short) card, a flash card (English: Flash Card), at least one disk storage device, a flash memory device, or any other non-volatile solid-state storage device.

A display screen is configured to display characters of at least one character type output by the input/output device.

A person skilled in the art may clearly understand that, for the purpose of convenient and brief description, for a detailed working process of the foregoing apparatus, processing device, and corresponding modules, refer to descriptions in the embodiment corresponding to any one of FIG. 1 to FIG. 15, and details are not described herein again.

A person of ordinary skill in the art may understand that all or a part of the steps of the method embodiments may be completed by instructions, or by related hardware controlled by instructions. The instructions may be stored in a computer-readable storage medium, and loaded and executed by the processor.

Therefore, an embodiment of this application provides a computer-readable storage medium. The computer-readable storage medium stores a plurality of instructions. The instructions can be loaded by a processor to perform the steps in the embodiment corresponding to any one of FIG. 1 to FIG. 15. For specific operations, refer to the description in the embodiment corresponding to any one of FIG. 1 to FIG. 15. Details are not described herein again.

The computer-readable storage medium may include a read-only memory (English: Read-Only Memory, ROM for short), a random access memory (English: Random Access Memory, RAM for short), a magnetic disk, or an optical disc.

The instructions stored in the computer-readable storage medium may perform the steps in the embodiment corresponding to any one of FIG. 1 to FIG. 15 in this application. Therefore, beneficial effects that can be achieved in the embodiment corresponding to any one of FIG. 1 to FIG. 15 in this application can be achieved. For details, refer to the foregoing descriptions. Details are not described herein again.

The foregoing describes in detail the wireless resource scheduling method, apparatus, and storage medium provided in this application. In the embodiments of this application, specific examples are used to describe principles and implementations of this application. The foregoing descriptions of the embodiments are merely provided to help understand the method and core idea of this application. In addition, a person skilled in the art can make variations and modifications to this application in terms of specific implementations and application scopes according to the idea of this application. Therefore, content of this specification shall not be construed as a limitation on this application. The present application is described with reference to the flowcharts and/or block diagrams of the method, the device (system), and the computer program product based on the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Alternatively, these computer program instructions may be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

Although optional embodiments of this application have been described, persons skilled in the art may make additional changes and modifications to these embodiments once they learn the basic inventive concept. Therefore, the appended claims shall be construed to cover the optional embodiments and all changes and modifications falling within the scope of the present application.

Apparently, a person skilled in the art may make various changes and variations to the embodiments of the present application without departing from the spirit and scope of the present application. Therefore, the present application is intended to cover the changes and variations provided that the changes and variations of the embodiments of the present application fall within the scope of the claims of the present application or equivalent technologies thereof

What is claimed is:

1. A wireless resource scheduling method, comprising:

obtaining, by an access device, a first station state set, wherein the first station state set comprises station states of a plurality of stations in a first time window;

obtaining, by the access device in a preset time window, first timeslot allocation information based on the station states, wherein the first timeslot allocation information comprises timeslot allocation information of the access device for each station for using a wireless resource in at least one time window, wherein the first time window, the preset time window and the at least one time window are different from each other; and broadcasting, by the access device, the first timeslot allocation information to the stations, respectively;

wherein the obtaining, by the access device, the first timeslot allocation information based on the station states, comprises:

determining, based on the timeslot allocation information for each station for using the wireless resource in the at least one time window, a plurality of pieces of schedule arrangement information corresponding to each timeslot, wherein a piece of schedule arrangement information comprises a receiving station and a sending station corresponding to a corresponding timeslot; and obtaining, based on the plurality of pieces of schedule arrangement information corresponding to each timeslot, the first timeslot allocation information.

2. The method according to claim 1, wherein the obtaining, by the access device, the first timeslot allocation information based on the station states, comprises:

obtaining a preset mapping relationship, wherein the preset mapping relationship comprises a mapping relationship between a plurality of timeslot parameters, timeslot parameter values corresponding to the plurality of timeslot parameters, and description information of the timeslot parameters; and generating the first timeslot allocation information based on the preset mapping relationship and the station states.

3. The method according to claim 1, wherein a station state of a third station of the stations comprises real-time traffic and a priority for accessing a wireless medium service, the first timeslot allocation information comprises a timeslot weight of the third station and the method further comprises:

receiving, by the access device, the station state from the third station to add to a second station state set, wherein the second station state set comprises station states of the plurality of stations in a second time window, and a start time point of the second time window lags behind an end time point of the first time window; and updating, by the access device, the timeslot weight of the third station in the first timeslot allocation information based on the second station state set, wherein a value of the timeslot weight is in a positive relationship with the priority of the third station and/or the real-time traffic of the third station.

4. The method according to claim 3, wherein the plurality of stations comprise a first station and a second station, and a priority of the first station is higher than a priority of the second station;

the first timeslot allocation information further comprises timeslot allocation information for using wireless resources in at least two time windows, the at least two time windows comprise at least a third time window and a fourth time window, and the fourth time window lags behind the third time window;

a quantity of timeslots occupied by the first station in each time window of the at least two time windows, or of the second time window and the at least two time windows, is larger than a quantity of timeslots occupied by the second station in each time window; and a time domain position of the first station in the third time window corresponds to a time domain position of the first station in the fourth time window, and a time domain position of the second station in the third time window corresponds to a time domain position of the second station in the fourth time window.

5. The method according to claim 4, wherein the step of obtaining, by the access device in the preset time window, the first timeslot allocation information based on the station states, comprises:

obtaining, by the access device in the second time window, the first timeslot allocation information based on the station states.

6. The method according to claim 4, wherein the step of broadcasting, by the access device, the first timeslot allocation information to the stations, respectively, comprises:

broadcasting, by the access device, the first timeslot allocation information to the stations, respectively before the second time window ends.

7. The method according to claim 1, wherein the obtaining, based on the plurality of pieces of schedule arrangement information corresponding to each timeslot, the first timeslot allocation information, comprises:

sorting the plurality of pieces of obtained schedule arrangement information based on timeslots in the timeslot allocation information, to obtain a first arrangement table;

determining whether at least one group of pieces of target schedule arrangement information meeting a specified condition exists in the plurality of pieces of schedule arrangement information, wherein the group of pieces of target schedule arrangement information comprises at least two pieces of schedule arrangement information;

merging, when the at least one group of pieces of target schedule arrangement information exists, timeslots for the at least two pieces of schedule arrangement information in the at least one group of target schedule arrangement information; and re-allocating timeslots based on a result of merging the at least one group of target schedule arrangement information, to obtain a first timeslot allocation information.

8. The method according to claim 7, wherein the determining whether the at least one group of target schedule arrangement information meeting the specified condition exists in the plurality of pieces of schedule arrangement information, comprises:

sorting the plurality of pieces of schedule arrangement information in the first arrangement table based on station addresses of receiving stations corresponding to the timeslots in the timeslot allocation information, to obtain a second arrangement table;

determining a first piece of schedule arrangement information on which no merger decision is performed in the second arrangement table, performing a merger decision on the first piece of schedule arrangement information, and determining whether a to-be-merged piece of schedule arrangement information meeting the specified condition exists in other pieces of schedule arrangement information after the first piece of schedule arrangement information;

when determining that the to-be-merged piece of schedule arrangement information exists, removing, from the second arrangement table, the first piece of schedule arrangement information and the to-be-merged piece of schedule arrangement information as a group of target schedule arrangement information; and repeating the foregoing steps until only one piece of schedule arrangement information or no piece of schedule arrangement information on which no merger decision is performed exists in the current second arrangement table.

9. The method according to claim 8, wherein the performing the merger decision on the first piece of schedule arrangement information, and determining whether the to-be-merged piece of schedule arrangement information meeting the specified condition exists in the other pieces of schedule arrangement information after the first piece of schedule arrangement information, comprises:

sequentially comparing the first piece of schedule arrangement information with the other pieces of schedule arrangement information after the first piece of schedule arrangement information, and when a first target other piece of schedule arrangement information meeting the specified condition is determined from the other pieces of schedule arrangement information, determining that the to-be-merged piece of schedule arrangement information meeting the specified condition exists in the other pieces of schedule arrangement information.

10. The method according to claim 8, wherein the meeting the specified condition comprises:

a receiving station in one of the other pieces of schedule arrangement information is different from a receiving station in the first piece of schedule arrangement information, and a sending station in the one of the other pieces of schedule arrangement information is a neighboring station of the receiving station in the first piece of schedule arrangement information, and signal strength received by the neighboring station is not higher than a specified threshold;

a receiving station in one of the other pieces of schedule arrangement information is different from a receiving station in the first piece of schedule arrangement information, and a sending station in the one of the other pieces of schedule arrangement information is not a neighboring station of the receiving station in the first piece of schedule arrangement information; and/or strength of signals received between every two sending stations that concurrently send data is not higher than a specified threshold, and receiving stations in the plurality of pieces of schedule arrangement information corresponding to the sending stations are different from each other.

11. The method according to claim 8, wherein the performing the merger decision on the first piece of schedule arrangement information, and determining whether the to-be-merged piece of schedule arrangement information meeting the specified condition exists in the other pieces of schedule arrangement information after the first piece of schedule arrangement information, comprises:

separately comparing the first piece of schedule arrangement information with the other pieces of schedule arrangement information after the first piece of schedule arrangement information, and when at least one target other piece of schedule arrangement information meeting the specified condition is determined from the other pieces of schedule arrangement information, determining that the to-be-merged piece of schedule arrangement information meeting the specified condition exists in the other pieces of schedule arrangement information.

12. The method according to claim 8, wherein the re-allocating the timeslots based on the result of merging each group of target schedule arrangement information, to obtain the first timeslot allocation information, comprises:

re-allocating timeslots for the plurality of pieces of schedule arrangement information based on a time sequence of timeslots corresponding to each merged group of target schedule arrangement information and timeslots corresponding to unmerged pieces of schedule arrangement information, to update the first timeslot allocation information.

13. The method according to claim 1, wherein after the broadcasting, by the access device, the first timeslot allocation information to the stations, respectively, the method further comprises:

executing, by the access device, the timeslot arrangement information in a specified timeslot.

14. The method according to claim 1, wherein after the broadcasting, by the access device, the first timeslot allocation information to the stations, respectively, the method further comprises:

re-generating and broadcasting, by the access device, timeslot arrangement information for the plurality of stations when receiving timeout information from a station.

15. The method according to claim 1, wherein the method further comprises:

scheduling, by the access device, synchronization based on a timing synchronization function (TSF) of the access device as a time reference.

16. The method according to claim 1, wherein the step of obtaining, by the access device in a preset time window, comprises:

determining, by the access device, non-colliding sending stations in a networking topology based on nearby station information sent by each station; and reducing, by the access device, timeslot allocation information of the non-colliding sending stations for generating the first timeslot allocation information.

17. An electronic device, comprising a processor and a memory, wherein the memory stores a computer program, and when the processor invokes the computer program in the memory, the processor is enabled to perform the wireless resource scheduling method according to claim 1.

18. A non-transitory computer-readable storage medium, wherein the computer-readable storage medium stores a plurality of instructions, and the instructions are suitable for being loaded by a processor to perform the wireless resource scheduling method according to claim 1.

19. A wireless resource scheduling method, comprising:

obtaining, by an access device, a first station state set, wherein the first station state set comprises station states of a plurality of stations in a first time window;

obtaining, by the access device in a preset time window, first timeslot allocation information based on the station states, wherein the first timeslot allocation information comprises timeslot allocation information of the access device for each station for using a wireless resource in at least one time window, wherein the first time window, the preset time window and the at least one time window are different from each other; and broadcasting, by the access device, the first timeslot allocation information to the stations, respectively;

wherein a station state of a third station of the stations comprises real-time traffic and a priority for accessing a wireless medium service, the first timeslot allocation information comprises a timeslot weight of the third station and the method further comprises:

receiving, by the access device, the station state from the third station to add to a second station state set, wherein the second station state set comprises station states of the plurality of stations in a second time window, and a start time point of the second time window lags behind an end time point of the first time window; and updating, by the access device, the timeslot weight of the third station in the first timeslot allocation information based on the second station state set, wherein a value of the timeslot weight is in a positive relationship with the priority of the third station and/or the real-time traffic of the third station.

* * * * *